(12) United States Patent
He et al.

(10) Patent No.: US 12,430,928 B2
(45) Date of Patent: Sep. 30, 2025

(54) POSITIONING METHOD BASED ON LANE LINE AND FEATURE POINT, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yuzhe He, Beijing (CN); Shenhua Hou, Beijing (CN); Yao Zhou, Beijing (CN); Liang Peng, Beijing (CN); Guowei Wan, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 399 days.

(21) Appl. No.: 18/088,954

(22) Filed: Dec. 27, 2022

(65) Prior Publication Data

US 2023/0134569 A1    May 4, 2023

(30) Foreign Application Priority Data

Dec. 29, 2021   (CN) .......................... 202111637724.3

(51) Int. Cl.
*G06V 20/58*   (2022.01)
*G06V 20/56*   (2022.01)
*B60W 60/00*   (2020.01)

(52) U.S. Cl.
CPC ............ *G06V 20/588* (2022.01); *G06V 20/58* (2022.01); *B60W 60/001* (2020.02);
(Continued)

(58) Field of Classification Search
CPC ................. G06V 20/588; G06V 20/58; B60W 2554/4041; B60W 2552/53; B60W 60/001; B60W 2554/4049; B60W 2520/28
(Continued)

(56) References Cited

U.S. PATENT DOCUMENTS

2005/0060069 A1    3/2005   Breed et al.
2019/0236399 A1*   8/2019   Soatto ................ G01C 21/1656
(Continued)

FOREIGN PATENT DOCUMENTS

CN    105783936    7/2016
CN    109724615    5/2019
(Continued)

OTHER PUBLICATIONS

Haoqi Cheng, ImPL-VIO: An Improved Monocular Visual-Inertial Odometry Using Point and Line Features, 2020, Springer (Year: 2020).*

(Continued)

*Primary Examiner* — Matthias S Weisfeld
(74) *Attorney, Agent, or Firm* — Pillsbury Winthrop Shaw Pittman, LLP

(57) ABSTRACT

A positioning method based on a lane line and a feature point, an electronic device, and a storage medium, which relate to fields of computer, automatic driving, intelligent transportation, computer vision. The method may include: determining first real-time measurement residuals according to first sensor information of a movable object detected, the first real-time measurement residuals including a first inertial measurement unit measurement residual, a first lane line measurement residual and a first non-lane line measurement residual; updating a state vector of the movable object according to a kinematic model of an inertial measurement (Continued)

unit and the first real-time measurement residuals; and determining a pose of the movable object at a time instant corresponding to the updated state vector according to a pose vector in the updated state vector.

20 Claims, 6 Drawing Sheets

(52) U.S. Cl.
CPC ..... *B60W 2520/28* (2013.01); *B60W 2552/53* (2020.02); *B60W 2554/4041* (2020.02); *B60W 2554/4049* (2020.02)

(58) Field of Classification Search
USPC .......................................................... 701/512
See application file for complete search history.

(56) References Cited

U.S. PATENT DOCUMENTS

| 2019/0293429 | A1 | 9/2019 | Cameron et al. |
| 2022/0018962 | A1* | 1/2022 | Pan .......................... G01S 17/66 |
| 2022/0228871 | A1 | 7/2022 | Ohata et al. |
| 2022/0292711 | A1* | 9/2022 | Pan .......................... G06T 7/38 |

FOREIGN PATENT DOCUMENTS

| CN | 110567480 | 12/2019 |
| CN | 110631593 | 12/2019 |
| CN | 110954112 | 4/2020 |
| CN | 110954113 | 4/2020 |
| CN | 111649739 | 9/2020 |
| CN | 112304302 | 2/2021 |
| CN | 112683281 | 4/2021 |
| CN | 112837352 | 5/2021 |
| CN | 113450411 | 9/2021 |
| CN | 113503872 | 10/2021 |
| CN | 113654555 | 11/2021 |
| JP | 2011106929 | 6/2011 |
| WO | 2021070813 | 4/2021 |
| WO | WO-2023023464 A1 * | 2/2023 | ............. G06T 13/40 |

OTHER PUBLICATIONS

Zhengshi Yu, Accelerometer Bias Calibration Using Attitude and Angular Velocity Information, Apr. 2016, Journal of Guidance, Control, and Dynamics vol. 39, No. 4 (Year: 2016).*
Office Action issued in corresponding Japanese Patent Application No. 2022-205078, dated Sep. 12, 2023.
Office Action issued in corresponding Chinese Patent Application No. 202111637724.3, dated Feb. 22, 2023.
European Search Report issued in corresponding European Patent Application No. 22216555.7, dated Jun. 1, 2023.
H. Cheng et al., "ImPL-VIO: An Improved Monocular Visual-Inertial Odometry Using Point and Line Features", Intelligent Robotics and Applications: 13th International Conference, ICIRA 2020, Proceedings, pp. 217-229 (Nov. 2020).
R. Kang et al., "VINS-Vehide: A Tightly-Coupled Vehide Dynamics Extension to Visual-Inertial State Estimator", 2019 IEEE Intelligent Transportation Systems Conference, pp. 3593-3600 (Oct. 27, 2019).
A. I. Mourikis et al., "A Multi-State Constraint Kalman Filter for Vision-aided Inertial Navigation", 2007 IEEE International Conference on Robotics and Automation, pp. 3565-3566 (2007).
W. Ye et al., "Robust and Efficient Vehicles Motion Estimation with Low-Cost Multi-Camera and Odometer-Gyroscope", 2019 IEEE/RSJ International Conference on Intelligent Robots and Systems, pp. 4490-4496 (Nov. 4, 2019).
Chinese Office Action issued in corresponding Chinese patent Application No. 202111637724.3, dated Oct. 10, 2022.

* cited by examiner

POSITIONING METHOD BASED ON LANE LINE AND FEATURE POINT, ELECTRONIC DEVICE, AND STORAGE MEDIUM

This application claims priority to Chinese Patent Application No. 202111637724.3, filed on Dec. 29, 2021, which is incorporated herein in its entirety by reference.

TECHNICAL FIELD

The present disclosure relates to a field of computer technology, in particular to fields of automatic driving, intelligent transportation, computer vision, etc., and more specifically, relates to a positioning method based on a lane line and a feature point, an electronic device, and a storage medium.

BACKGROUND

With the development of computer and Internet technology, a pilot assisted driving scheme for controlling a movement of a vehicle or a robot has been derived in fields of vehicle and robot. The pilot assisted driving scheme may assist the vehicle to control a cruising velocity, merge into a main road, enter a ramp, and change a lane at an appropriate time according to a navigation guidance path, a velocity limit information, and a traffic flow state in high-speed, urban fast, and urban road scenes, as well as areas with and without a high-definition map.

SUMMARY

The present disclosure provides a positioning method based on a lane line and a feature point, an electronic device, and a storage medium.

According to an aspect of the present disclosure, a positioning method based on a lane line and a feature point is provided, including: determining a plurality of first real-time measurement residuals according to a plurality of first sensor information of a movable object detected, wherein the first sensor information includes a first inertial measurement unit information, a first lane line feature information and a first non-lane line feature point information, and the first real-time measurement residual includes a first inertial measurement unit measurement residual, a first lane line measurement residual and a first non-lane line measurement residual; updating a state vector of the movable object according to a kinematic model of an inertial measurement unit and the plurality of first real-time measurement residuals; and determining a pose of the movable object at a time instant corresponding to the updated state vector according to a pose vector in the updated state vector.

According to another aspect of the present disclosure, an electronic device is provided, including: at least one processor; and a memory communicatively connected to the at least one processor, wherein the memory stores instructions executable by the at least one processor, and the instructions, when executed by the at least one processor, are configured to cause the at least one processor to implement the above-mentioned positioning method based on the lane line and the feature point.

According to another aspect of the present disclosure, a non-transitory computer-readable storage medium having computer instructions therein is provided, wherein the computer instructions are configured to cause a computer system to implement the above-mentioned positioning method based on the lane line and the feature point.

According to another aspect of the present disclosure, an autonomous vehicle is provided, including the electronic device of the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In the technical solution of the present disclosure, the collection, storage, use, processing, transmission, provision and disclosure of information involved comply with the provisions of relevant laws and regulations, take necessary confidentiality measures, and do not violate public order and good customs.

A pilot assisted driving scheme needs to achieve a real-time positioning of a vehicle based on a visual inertial odometer positioning technology, followed by piloting the vehicle according to a positioning result. The vision inertial odometer positioning technology achieves a vehicle positioning by adopting a pure vision method combined with a local odometer model and fusing an image and an Inertial Measurement Unit (IMU) information.

In an expressway and some highway scenes, there are many dynamic vehicles and an environment texture is weak. It is difficult to extract a sufficiently robust feature point by using the above visual inertial odometer positioning scheme. In an outdoor scene, the illumination changes obviously, and a direct method matching is easy to fail, which leads to a lower accuracy and an insufficient robustness of the visual inertial odometer positioning scheme relying only on the image and an IMU feature, and there are many cases of positioning failure.

Figure 1:
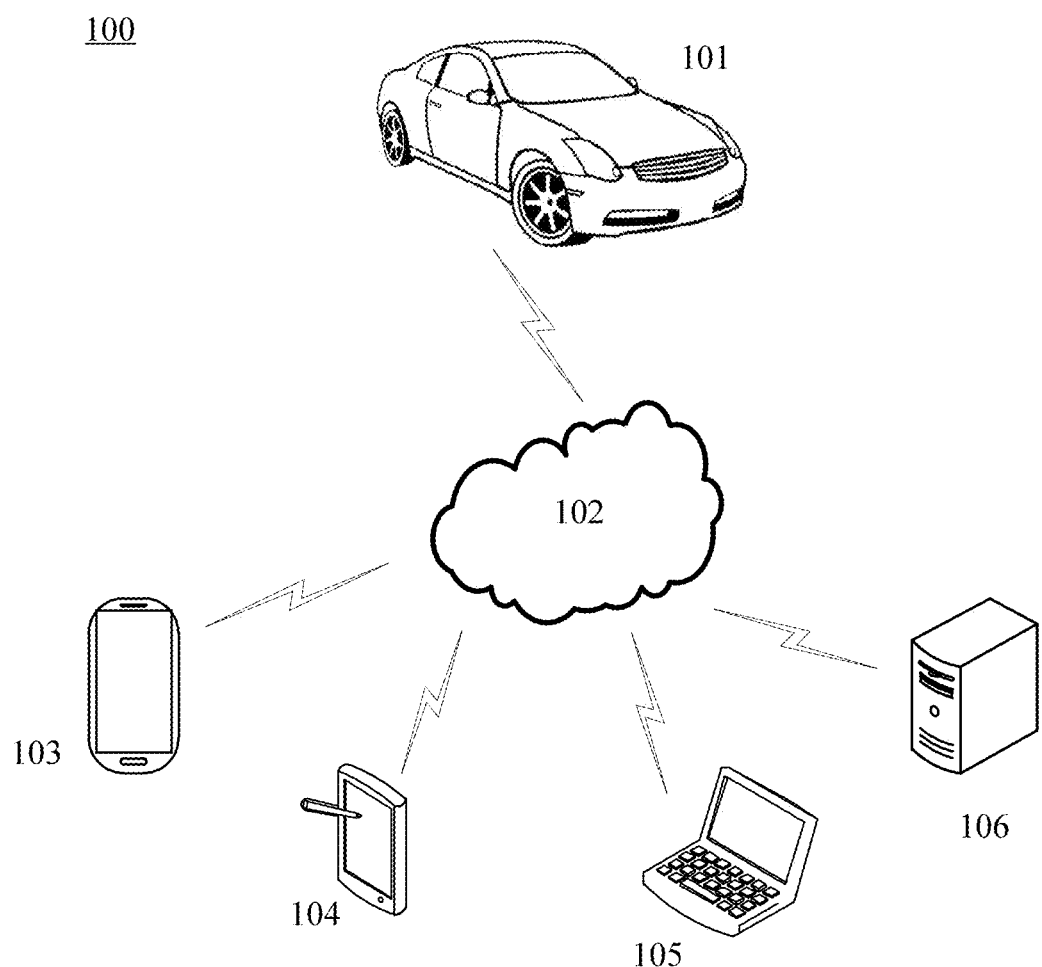
FIG. 1 schematically shows an exemplary system architecture that may be applied to a positioning method and apparatus based on a lane line and a feature point according to embodiments of the present disclosure.

FIG. 1 schematically shows an exemplary system architecture that may be applied to a positioning method and apparatus based on a lane line and a feature point according to embodiments of the present disclosure.

It should be noted that FIG. 1 is only an example of the system architecture that may be applied to embodiments of the present disclosure to help those skilled in the art understand the technical content of the present disclosure, but it does not mean that embodiments of the present disclosure cannot be used for other devices, systems, environment, or scenarios. For example, in another embodiment, an exemplary system architecture that may be applied to a positioning method and apparatus based on a lane line and a feature point may include a terminal device, and the terminal device may achieve the positioning method and apparatus based on the lane line and the feature point provided by embodiments of the present disclosure without interacting with a server.

As shown in FIG. 1, a system architecture 100 according to this embodiment may include a vehicle 101, a network 102, and terminal devices 103, 104, 105, and 106. The network 102 is a medium for providing a communication link between the vehicle 101 and the terminal devices 103, 104, 105, and 106. The network 102 may include various connection types, such as a wired and/or a wireless communication link and the like.

An In-Vehicle Infotainment (IVI) of the vehicle 101 may interact with the terminal devices 103, 104, 105, and 106 through the network 102 to receive or send a message.

The terminal devices 103, 104, 105 and 106 may be installed with various communication client applications, such as a knowledge reading application, a web browser application, a search application, an instant messaging tool, an email client and/or a social platform software (just examples).

The terminal devices 103, 104, and 105 may be various electronic devices with a display screen and supporting web browsing, including but not limited to a smart phone, a tablet, a laptop, a desktop computer, and the like.

The terminal device 106 may also be a server providing various services, such as a background management server (for example only) that processes data received by the IVI 101. The background management server may analyze and process the data received by the IVI, and feedback a processing result to the IVI 101 or other terminal devices 103, 104, and 105, etc. The server may be a cloud server which is also referred to as a cloud computing server or a cloud host and which is a host product in the cloud computing service system to solve shortcomings of difficult management and weak business scalability in existing physical host and VPS (Virtual Private Server) service. The server may also be a server of a distributed system, or a server combined with a block-chain.

It should be noted that the positioning method based on the lane line and the feature point provided by embodiments of the present disclosure may generally be executed by the IVI in the vehicle 101. Accordingly, the positioning apparatus based on the lane line and the feature point provided by embodiments of the present disclosure may also be disposed in the vehicle 101.

Alternatively, the positioning method based on the lane line and the feature point provided by embodiments of the present disclosure may also be generally executed by the terminal devices 103, 104, 105 and 106. Correspondingly, the positioning apparatus based on the lane line and the feature point provided by embodiments of the present disclosure may generally be disposed in the terminal devices 103, 104, 105 and 106. The positioning method based on the lane line and the feature point provided by embodiments of the present disclosure may also be executed by a server or a server cluster that is different from the terminal devices 103, 104, 105 and 106 and may communicate with the terminal devices 103, 104, 105 and 106. Correspondingly, the positioning apparatus based on the lane line and the feature point provided by embodiments of the present disclosure may also be disposed in the server or the server cluster that is different from the terminal devices 103, 104, 105 and 106 and may communicate with the terminal devices 103, 104, 105 and 106.

For example, when determining a pose of a movable object, the IVI in the vehicle 101 or the terminal devices 103, 104, 105, and 106 may determine a plurality of first real-time measurement residuals according to a plurality of first sensor information of the movable object detected, update a state vector of the movable object according to a kinematic model of an IMU and the plurality of first real-time measurement residuals, and determine a pose of the movable object at a time instant corresponding to the updated state vector according to a pose vector in the updated state vector. Alternatively, the server or the server cluster that may communicate with the vehicle 101 or the terminal devices 103, 104, 105, and 106 may analyze the plurality of first sensor information and determine the pose of the movable object. It should be noted that the first sensor information may include a first IMU information, a first lane line feature information and a first non-lane line feature point information.

It should be understood that the number of terminal devices, networks and servers shown in FIG. 1 are merely illustrative. There may be any number of terminal devices, networks and servers as required.

Figure 2:
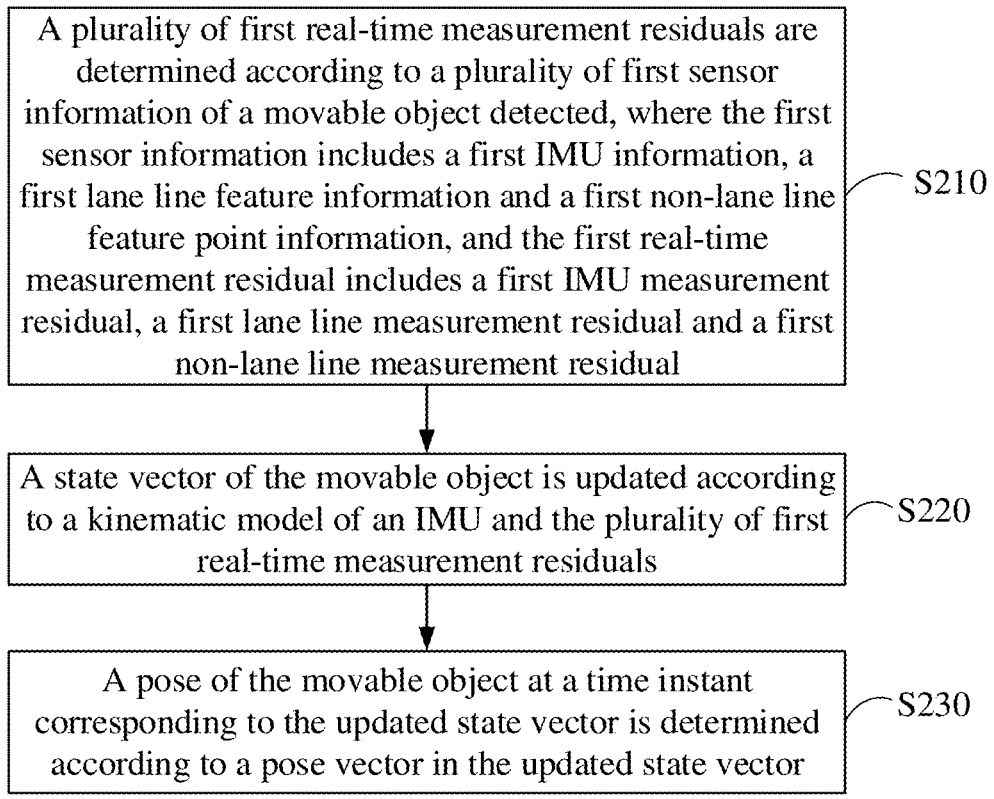
FIG. 2 schematically shows a flowchart of a positioning method based on a lane line and a feature point according to embodiments of the present disclosure.

FIG. 2 schematically shows a flowchart of a positioning method based on a lane line and a feature point according to embodiments of the present disclosure.

As shown in FIG. 2, the method includes operations S210 to S230.

In operation S210, a plurality of first real-time measurement residuals are determined according to a plurality of first sensor information of a movable object detected, where the first sensor information includes a first IMU information, a first lane line feature information and a first non-lane line feature point information, and the first real-time measurement residual includes a first IMU measurement residual, a first lane line measurement residual and a first non-lane line measurement residual.

In operation S220, a state vector of the movable object is updated according to a kinematic model of an IMU and the plurality of first real-time measurement residuals.

In operation S230, a pose of the movable object at a time instant corresponding to the updated state vector is determined according to a pose vector in the updated state vector.

According to embodiments of the present disclosure, the movable object may include a vehicle, a robot, etc. The movable object may be provided with a plurality of sensors, which may include at least one selected from: IMU, an image acquisition apparatus, a wheel speedometer, a vehicle speedometer, etc. The first sensor information may include at least one of the first IMU information, the first lane line feature information, the first non-lane line feature point information, a first wheel speedometer scale information, a first vehicle speedometer information, etc. The first real-time measurement residual may include at least one of the first IMU measurement residual, the first lane line measurement residual, the first non-lane line measurement residual, a first wheel speedometer scale measurement residual and a first vehicle speedometer measurement residual.

According to embodiments of the present disclosure, the IMU may collect information such as an angular velocity (rad/s) of the vehicle and an acceleration (m/s$^2$) of the vehicle in real-time to form the first IMU information. The image acquisition apparatus may collect information such as a lane line image and a non-lane line image around the vehicle in real-time. A feature point information of each image may be obtained by processing the non-lane line image such as matching an extracted feature, using a sparse optical flow method to track a corner, or using a direct method to match a pixel point with an obvious gray gradient, so as to form the first non-lane line feature point information. A three-dimensional coordinate information of each point in the lane line in a vehicle body coordinate system may be obtained by processing the lane line image, so as to form the first lane line feature point information. The wheel speedometer may collect information such as a linear velocity (m/s) of each wheel of the vehicle, such as a left wheel and a right wheel, in real-time to form the first wheel speedometer scale information. The vehicle speedometer may collect information such as a vehicle velocity (m/s) in real-time to form the first vehicle speedometer information.

It should be noted that the above plurality of first sensor information detected in real-time may be collected in a unit of a sliding window. A sliding window of each frame may include one frame image, a plurality of lane line information, one vehicle velocity and one wheel velocity. The sliding window of each frame may collect an IMU information from a time instant when a sliding window of a previous frame corresponding to the sliding window of that frame is positioned to a time instant when the sliding window of that frame is positioned. Each frame corresponds to a time instant. One time instant corresponds to one camera coordinate system and one IMU coordinate system.

According to embodiments of the present disclosure, the state vector of the movable object may include at least one of a state vector of the IMU, a state vector of a camera pose in the sliding window, a state vector of a wheel speedometer scale, and so no. The state vector of the IMU may represent $x_I$, $x_I$ may include a rotation $q_w^b$ between the IMU coordinate system and a world coordinate system, a translation $p_b^w$ between the IMU coordinate system and the world coordinate system, a velocity $v_b^w$ of the IMU coordinate system represented in the world coordinate system, an angular speedometer bias (zero-bias) $b_g$ of the IMU, and an accelerometer bias $b_a$ of the IMU, so as to obtain $x_I = [q_w^{bT} \ p_b^{wT} \ b_g^T \ b_a^T]^T$, where T represents transposition. The state vector of the camera pose in the sliding window may represent as $x_{C_i} = [q_w^{C_i^T} \ p_{C_i}^{wT}]^T$, where $x_{C_i}$ may represent a camera pose corresponding to a sliding window of an $i^{th}$ frame, $q_w^{C_i}$ may represent a rotation between a camera coordinate system corresponding to the sliding window of the $i^{th}$ frame and the world coordinate system, $P_{C_i}^w$ may represent a translation between the camera coordinate system corresponding to the sliding window of the $i^{th}$ frame and the world coordinate system. The state vector of the wheel speedometer scale may include $s_l$ and $s_r$, where $s_l$ represents a wheel speedometer scale of the left wheel, and $s_r$ represents a wheel speedometer scale of the right wheel. Based on this, the state vector of the movable object may be obtained and represented as $$x = [x_I^T x_{C_0}^T x_{C_1}^T \ldots x_{C_N}^T s_l s_r]^T.$$

According to embodiments of the present disclosure, a value of each vector in the state vector of the movable object may change over time. According to the first IMU information, the first lane line feature information, the first non-lane line feature point information, the first wheel speedometer scale information, the first vehicle speedometer information of the movable object detected in real-time, all the information is fused to achieve a real-time update of the state vector. A fusion framework may adopt an iterative optimization method or a Kalman filtering method.

For example, the fusion framework may adopt a MSCKF (Multi-State Constraint Kalman Filter). The real-time update of the state vector is achieved based on an error-state Kalman filtering method. A state of the filter may include an error state of the IMU, an error state of the camera pose in the sliding window, and an error state of the wheel speedometer scale. An error state vector of the IMU may be obtained and represented as $\tilde{x}_I = [\tilde{\theta}_w^{bT} \ \tilde{p}_b^{wT} \ \tilde{v}_b^{wT} \ \tilde{b}_g^T \ \tilde{b}_a^T]^T$ according to the state vector $x_I$ of the IMU, where each vector in $\tilde{x}_I$ may represent an error of each vector in $x_I$ correspondingly. An error state vector of the camera pose in the sliding window may be obtained and represented as $\tilde{x}_{C_i} = [\tilde{\theta}_w^{C_i^T} \ \tilde{p}_{C_i}^{wT}]^T$ according to the state vector $x_{C_i}$ of the camera pose in the sliding window, where each vector in $\tilde{x}_{C_i}$ may represent an error of each vector in $x_{C_i}$ correspondingly. Error state vectors of the wheel speedometer scale may be obtained and represented as $\tilde{s}_l$ and $\tilde{s}_r$ according to the state vectors $s_l$ and $s_r$ of the wheel speedometer scale. Based on this, a state vector of the filter may be obtained and represented as $\tilde{x} = [\tilde{x}_I^T \ \tilde{x}_{C_0}^T \ \tilde{x}_{C_1}^T \ldots \tilde{x}_{C_N}^T \ \tilde{s}_l \ \tilde{s}_r]^T$. The state vector of the movable object may be updated in real-time by updating the state vector of the filter in real-time.

According to embodiments of the present disclosure, an IMU pose of the movable object at a current time instant may be output after updating the state vector of the movable object. A pose of the movable object at the current time instant may be determined according to the IMU pose.

Through the above embodiments of the present disclosure, the IMU, a lane line feature, a non-lane line feature, and even a wheel speedometer feature and a vehicle speedometer feature may be fused to achieve the visual inertial odometer positioning, thereby obtaining a smooth local positioning result with a high lateral accuracy.

A method shown in FIG. 2 is further described below in combination with specific embodiments.

According to embodiments of the present disclosure, the above-mentioned first sensor information may be a sensor information collected within a period of time after all the state vectors of the movable object are initialized. Before the state vector of the movable object is initialized, the above-mentioned positioning method based on the lane line and the feature point may further include: determining a plurality of second real-time measurement residuals according to a plurality of second sensor information of the movable object detected, where the second sensor information includes a second IMU information, a second lane line feature information and a second non-lane line feature point information, and the second real-time measurement residual includes a second IMU measurement residual, a second lane line measurement residual and a second non-lane line measurement residual; determining an initialization pose of the movable object according to the plurality of second real-time measurement residuals; determining an initialization angular speedometer bias of the movable object according to the second lane line feature information and the second IMU information; determining an initialization wheel speedometer scale and/or an initialization accelerometer bias according to the initialization angular speedometer bias, the second IMU information and the initialization pose; and determining an initialized state vector according to the initialization pose, the initialization angular speedometer bias, the initialization wheel speedometer scale, and the initialization accelerometer bias.

According to embodiments of the present disclosure, the second sensor information may be a sensor information collected within a period of time in which the initialization for the state vector of the movable object is not achieved. The second sensor information may include at least one of the second IMU information, the second lane line feature information, the second non-lane line feature point information, a second wheel speedometer scale information, a second vehicle speedometer information, or other information. The second real-time measurement residual may include at least one of the second IMU measurement residual, the second lane line measurement residual, the second non-lane line measurement residual, a second wheel speedometer scale measurement residual, a second vehicle speedometer measurement residual, or other residuals. The second sensor information may also be detected by the IMU, the image acquisition apparatus, the wheel speedometer, and the vehicle speedometer which are provided in the movable object.

According to embodiments of the present disclosure, in a process of initializing the state vector of the movable object, a phased method may be used to gradually estimate, adjust, and optimize the state vector of the movable object.

Figure 3:
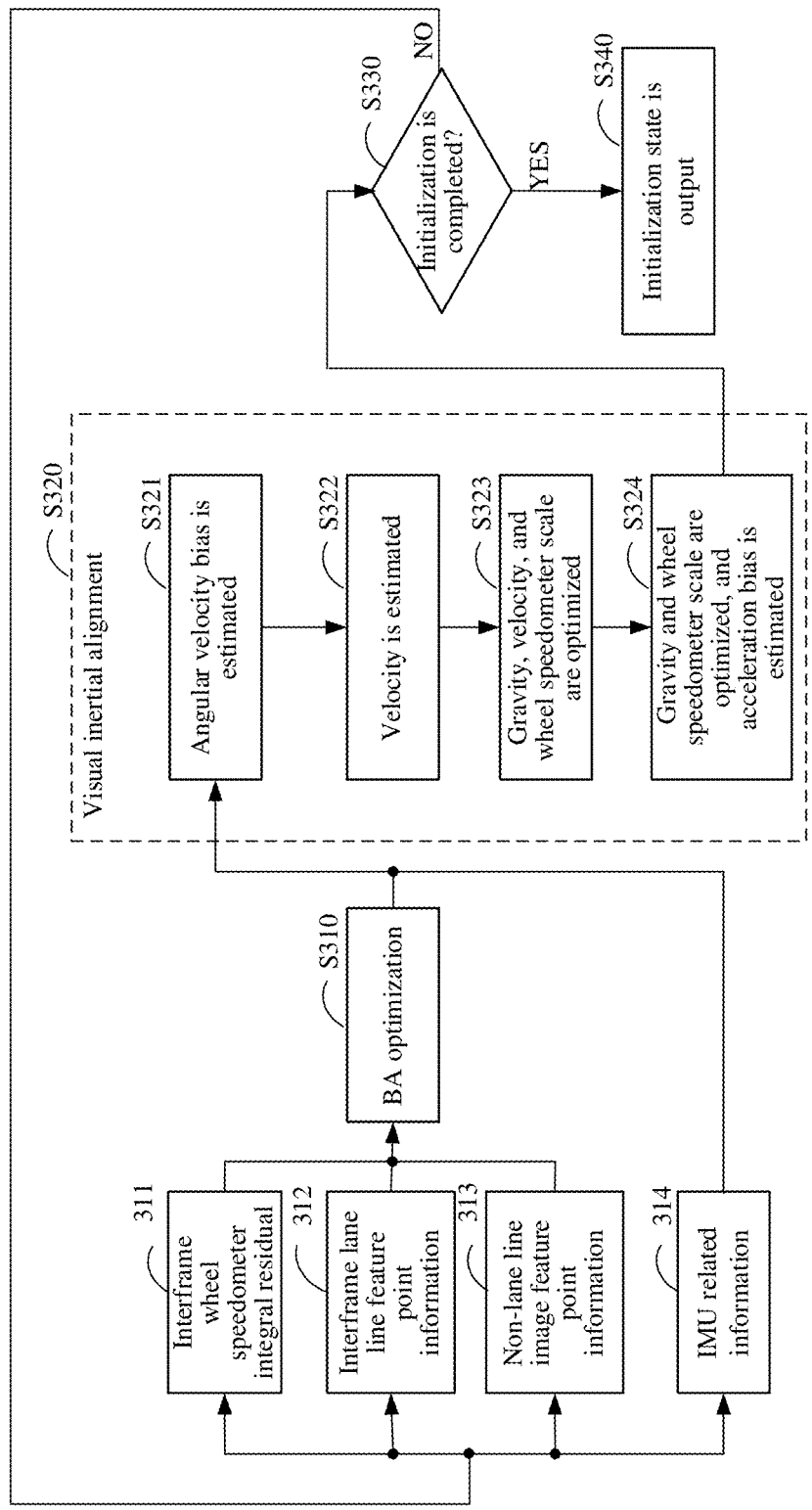
FIG. 3 schematically shows a schematic diagram of an initialization process according to embodiments of the present disclosure.

FIG. 3 schematically shows a schematic diagram of an initialization process according to embodiments of the present disclosure.

As shown in FIG. 3, the initialization process may include operations S310 to S340.

In operation S310, a bundle adjustment (BA) optimization is performed. In this operation, the initialization pose of the movable object may be determined according to the plurality of second real-time measurement residuals. For example, a pose of each image frame in the sliding window may be solved based on a BA optimization method, by fusing a plurality of sensor information such as an interframe wheel speedometer integral residual 311, an interframe lane line feature point information 312, a non-lane line image feature point information 313 and an IMU related information 314, so as to achieve the initialization of the pose.

In operation S320, a visual inertial alignment is performed. This operation, for example, may further be decomposed into sub steps such as operations S321 to S324 to achieve step-by-step estimation of other state variables except the pose.

In operation S321, the angular velocity bias is estimated. In this operation, for example, the initialization angular speedometer bias of the movable object may be solved according to the second lane line feature information and the second IMU information, combined with a least squares method.

In operation S322, a velocity, a gravity, and a wheel speedometer scale are estimated. In this operation, estimation values of the velocity, gravity and the wheel speedometer scale may be solved according to velocity vectors, a time difference, gravity vectors, wheel speedometer scales and pose vectors at two time instants when sliding windows of two adjacent frames are positioned, combined with the least squares method.

In operation S323, gravity, the velocity, and the wheel speedometer scale are optimized. In this operation, for example, an optimization of gravity, the velocity, and the wheel speedometer scale may be achieved according to a gravity vector of a preset length, combined with estimation values of the velocity, gravity, and the wheel speedometer scale.

In operation S324, gravity and the wheel speedometer scale are optimized, and an acceleration bias is estimated. In this operation, for example, at least one of the initialization wheel speedometer scale and the initialization accelerometer bias may be determined according to the initialization angular speedometer bias, the second IMU information, and the initialization pose. It should be noted that an initialization gravity may also be determined in this operation, and gravity may remain unchanged after initialization.

In operation S330, it may be determined whether the initialization is completed or not. If the initialization is completed, operation S340 is performed. If the initialization is not completed, operations S310 to S320 are performed.

In operation S340, an initialization state is output.

According to embodiments of the present disclosure, in a case that the initialization is not completed, the above operations S310 to S320 may be repeated until the state initialization is completed. An optimized state vector of each image frame is obtained, which may include the angular speedometer bias, the acceleration bias, the pose (including the rotation and the translation), the velocity vector, etc.

Through the above embodiments of the present disclosure, combining the IMU, the lane line feature, the non-lane line feature, and even fusing the wheel speedometer feature and the vehicle speedometer feature to achieve the initialization of the state vector may improve a success rate of the initialization. In addition, performing the visual inertial odometer positioning based on the initialization state vector may improve a stability of a solution, thereby obtaining the smooth local positioning result with the high lateral accuracy.

According to embodiments of the present disclosure, in the process of determining the initialization pose based on the BA optimization, for example, it is necessary to obtain an association relationship between an interframe feature point and the lane line in the sliding window. The feature point may be extracted by using a method based on deep learning, which may filter out a feature point located in a foreground. An interframe matching of the feature point may be achieved by using a method of descriptor nearest neighbor, so as to obtain an interframe point pair matching. When acquiring a 3D lane line association relationship, the IMU and a wheel speedometer integration may be used to obtain an interframe association pose, then a point on the 3D lane line is re-projected into previous frames, and a lane line point is searched within a certain radius, so as to obtain a matching pair between the point and the line. Next, the pose of the image frame in the sliding window may be optimized by using the graph optimization method, according to the above association relationship.

According to embodiments of the present disclosure, the second wheel speedometer scale measurement residual may represent a wheel speedometer integral residual between two time instants when sliding windows of two adjacent frames are positioned. Determining a plurality of second real-time measurement residuals according to a plurality of second sensor information of a movable object detected includes: determining, for each time instant of the two time instants, a seventh rotation and an eighth translation between an IMU coordinate system and a world coordinate system; and determining the wheel speedometer integral residual according to a third measurement value of a first rotation offset formed by the IMU coordinate system at the two time instants, a fourth measurement value of a translation offset formed by a wheel speedometer integration at the two time instants, an angular speedometer bias of the IMU, the seventh rotation and the eighth translation corresponding to each of the two time instants.

According to embodiments of the present disclosure, for example, a relative pose transformation between different time instants when sliding windows of different frames are positioned may be obtained through the IMU and the wheel speedometer integration. An interframe wheel speedometer integral residual $r_I$ may be constructed between time instants when sliding windows of any two adjacent frames are positioned, as shown in equation (1).

$$r_I = \begin{bmatrix} R_w^{b_i}(p_{b_{i+1}}^w - p_{b_i}^w) - \hat{p}_{b_{i+1}}^{b_i} \\ 0.5 J_{b_g} \delta b_g - \left(q_w^{b_{i+1}} \otimes q_{b_i}^w \otimes \hat{\gamma}_{b_{i+1}}^b\right)_{vec} \\ \delta b_g \end{bmatrix} \quad (1)$$

In equation (1), w may represent the world coordinate system. $b_i$ may represent an IMU coordinate system corresponding the sliding window of the $i^{th}$ frame. $R_w^{b_i}$ may represent a seventh rotation between the IMU coordinate system corresponding to the sliding window of the $i^{th}$ frame and the world coordinate system, which is represented in a rotation matrix form. $q_{b_i}^w$ may represent a seventh rotation between the IMU coordinate system corresponding to the sliding window of the $i^{th}$ frame and the world coordinate system, which is represented in a quaternion form. $p_{b_i}^w$ may represent an eighth translation between the IMU coordinate system corresponding to the sliding window of the $i^{th}$ frame and the world coordinate system. $p_{b_{i+1}}^{b_i}$ may represent a fourth measurement value of a translation offset of a wheel speedometer integration between a time instant when the sliding window of the $i^{th}$ frame is positioned and a time instant when a sliding window of an (i+1)th frame is positioned. $\hat{\gamma}_{b_{i+1}}^{b_i}$ may represent a third measurement value of a first rotation offset formed by the IMU coordinate system between the time instant when the sliding window of the $i^{th}$ frame is positioned and the time instant when the sliding window of the (i+1)th frame is positioned. $b_g$ may represent the angular speedometer bias of the IMU. $J_{b_g}$ may represent a Jacobi matrix of a rotation integration with respect to the angular velocity bias.

Through the above embodiments of the present disclosure, the second wheel speedometer scale measurement residual may be calculated, which is convenient for initializing the pose of the movable object.

According to embodiments of the present disclosure, the second lane line measurement residual may represent a distance residual formed by a line corresponding to a target second lane line feature point at a sixth sliding window and a feature point position corresponding to the target second lane line feature point at a seventh sliding window, and a time instant corresponding to the sixth sliding window is earlier than a time instant corresponding to the seventh sliding window. Determining a plurality of second real-time measurement residuals according to a plurality of second sensor information of a movable object detected includes: determining a fourth translation and a third rotation between an IMU coordinate system corresponding to the sixth sliding window and a world coordinate system, and a fifth translation and a fourth rotation between an IMU coordinate system corresponding to the seventh sliding window and the world coordinate system; determining a third position information of the target second lane line feature point in a normalization plane corresponding to a sixth image frame, where the sixth image frame corresponds to the sixth sliding window; determining a fourth position information of the target second lane line feature point in a normalization plane corresponding to a seventh image frame, where the seventh image frame corresponds to the seventh sliding window; determining a direction vector of a line corresponding to the target second lane line feature point, where the line is in the sixth image frame; and determining the second lane line measurement residual according to the third position information, the fourth translation, the third rotation, the fifth translation, the fourth rotation, the fourth position information, the direction vector, an extrinsic parameter of a camera, and an extrinsic parameter of the IMU.

Figure 4A:
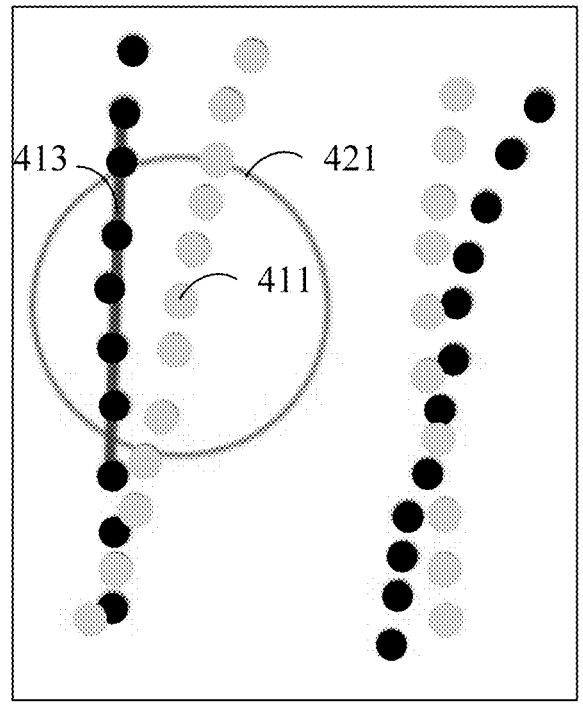
FIG. 4A schematically shows a schematic diagram of determining a point and line association relationship of a lane line according to embodiments of the present disclosure.

FIG. 4A schematically shows a schematic diagram of determining a point and line association relationship of a lane line according to embodiments of the present disclosure.

Figure 4B:
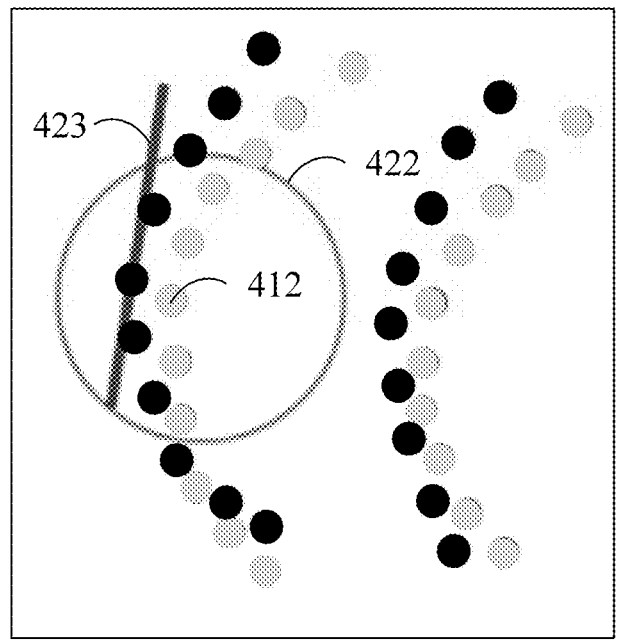
FIG. 4B schematically shows a schematic diagram of determining a point and line association relationship of a lane line according to embodiments of the present disclosure.

FIG. 4B schematically shows a schematic diagram of determining a point and line association relationship of a lane line according to embodiments of the present disclosure.

As shown in FIG. 4A and FIG. 4B, for example, a solid point represents a lane line 3D point corresponding to a lane line collected by the sliding window of a previous frame. For example, a hollow point represents a lane line 3D point corresponding to a lane line collected by a sliding window of a current frame. For example, hollow points 411 and 412 represent points to be matched. Circular regions 421 and 422 may represent search radius ranges. Lines 413 and 423 may represent fitting lines corresponding to relevant lane lines. An association relationship between the point and the line may be obtained by converting the lane line 3D point into a few previous frames. For example, searching the lane line 3D point 411 within the certain search radius range 421 may obtain an association relationship between the lane line collected by the sliding window of the previous frame and the lane line collected by the sliding window of the current frame, and may determine the matching pair between the point and the line.

According to embodiments of the present disclosure, an interframe constraint of the lane line may be constructed as a distance residual from the point to the line by a point-line matching pair of the lane line. A position of a $l^{th}$ 3D point of a $k^{th}$ lane line in a camera coordinate system corresponding to a sliding window of a j-th frame is set as $p_k^{l_j}$. A direction vector of a matching line corresponding to the point is set as V. A point on the line is set as $p_l$. A residual $r_l$ constructed according to the lane line may be presented as equation (2).

$$r_l = \lfloor V \rfloor_x (R_b^c (R_w^{b_i}(R_{bj}^w(R_c^b p_k^{l_j} + p_{bj}^w) + p_w^{b_i}) + p_b^c - p_l) \quad (2)$$

In equation (2), $R_b^c$ may represent an extrinsic parameter of a camera. $p_b^c$ may represent an extrinsic parameter of the IMU. $R_w^{b_i}$ may represent a third rotation between the IMU coordinate system corresponding to the sliding window of the $i^{th}$ frame and the world coordinate system. $p_w^{b_i}$ may represent a fourth translation between the IMU coordinate system corresponding to the sliding window of the $i^{th}$ frame and the world coordinate system. $R_{b_j}^w$ may represent a fourth rotation between an IMU coordinate system corresponding to the sliding window of the $j^{th}$ frame and the world coordinate system. $p_{b_j}^w$ may represent a fifth translation between the IMU coordinate system corresponding to the sliding window of the $j^{th}$ frame and the world coordinate system. The sliding window of the $i^{th}$ frame may correspond to the sixth sliding window. The sliding window of the $j^{th}$ frame may correspond to the seventh sliding window. The matching line may include a line corresponding to the sixth sliding window. $p_l$ may represent the third position information of the target second lane line feature point in the normalization plane corresponding to the sixth image frame. $p_k^{l_j}$ may represent the fourth position information of the target second lane line feature point in the normalization plane corresponding to the seventh image frame. V may represent a direction vector of a line in the sixth image frame corresponding to the target second lane line feature point.

Through the above embodiments of the present disclosure, the second lane line measurement residual may be calculated, which is convenient for initializing the pose of the movable object.

According to embodiments of the present disclosure, the second non-lane line measurement residual may represent a re-projection residual of a target second non-lane line feature point in an eighth image frame corresponding to an eighth sliding window. Determining a plurality of second real-time measurement residuals according to a plurality of second sensor information of a movable object detected includes: determining a second measurement value of a fifth position information of the target second non-lane line feature point in a camera coordinate system corresponding to the eighth sliding window, according to a first pixel abscissa and a first pixel column coordinate of the target second non-lane line feature point in the camera coordinate system corresponding to the eighth sliding window; determining a fifth rotation and a sixth translation between a world coordinate system and an IMU coordinate system corresponding to the eighth sliding window, and a sixth rotation and a seventh translation between the world coordinate system and an IMU coordinate system corresponding to a ninth sliding window, where a time instant corresponding to the ninth sliding window is earlier than a time instant corresponding to the eighth sliding window; determining a second calculation value of the fifth position information of the target second non-lane line feature point in the camera coordinate system corresponding to the eighth sliding window, according to a second pixel abscissa and a second pixel column coordinate of the target second non-lane line feature point in a camera coordinate system corresponding to the ninth sliding window, the fifth rotation, the sixth translation, the sixth rotation, the seventh translation, an extrinsic parameter of a camera, and an extrinsic parameter of the IMU; and determining the second non-lane line measurement residual according to the second measurement value and the second calculation value.

According to embodiments of the present disclosure, a re-projection residual of the point may be constructed by a feature matching point pair of the image. If a $l^{th}$ feature point is observed by an $i^{th}$ image frame and a $j^{th}$ image frame respectively, and a re-projection residual $r_p$ constructed according to an image feature point pair may be represented as equation (3).

$$\hat{p}_l^{c_j} = \pi_c^{-1}\left(\begin{bmatrix} \hat{u}_l^{c_j} \\ \hat{v}_l^{c_j} \end{bmatrix}\right) \quad (3)$$

$$p_l^{c_j} = R_b^c\left(R_w^{b_j}\left(R_{b_i}^w\left(R_c^b \frac{1}{\lambda_l}\pi_c^{-1}\left(\begin{bmatrix} u_l^{c_i} \\ v_l^{c_i} \end{bmatrix}\right) + p_c^b\right) + p_{b_i}^w - p_{b_j}^w\right) - p_c^b\right)$$

$$r_p = \hat{p}_l^{c_j} - p_l^{c_j}$$

In equation (3), $c_j$ may represent a camera coordinate system corresponding to the sliding window of the $j^{th}$ frame. $\hat{p}_l^{c_i}$ may represent a second measurement value of the $l^{th}$ feature point in a normalization plane coordinate in the camera coordinate system corresponding to the sliding window of the $j^{th}$ frame. $\hat{u}_l^{c_j}$ may represent a first pixel abscissa of the $l^{th}$ feature point in the normalization plane coordinate in the camera coordinate system corresponding to the sliding window of the $j^{th}$ frame. $\hat{v}_l^{c_j}$ may represent a first pixel column coordinate of the $l^{th}$ feature point in the normalization plane coordinate in the camera coordinate system corresponding to the sliding window of the $j^{th}$ frame. $p_l^{c_j}$ may represent a second calculation value of the $l^{th}$ feature point in the normalization plane coordinate in the camera coordinate system corresponding to the sliding window of the $j^{th}$ frame. $R_w^{b_j}$ may represent a fifth rotation between the IMU coordinate system corresponding to the sliding window of the $j^{th}$ frame and the world coordinate system. $R_{b_i}^w$ may represent a sixth rotation between the IMU coordinate system corresponding to the sliding window of the $i^{th}$ frame and the world coordinate system. $p_{b_j}^w$ may represent a sixth translation between the IMU coordinate system corresponding to the sliding window of the $j^{th}$ frame and the world coordinate system. $p_{b_i}^w$ may represent a seventh translation between the IMU coordinate system corresponding to the sliding window of the $i^{th}$ frame and the world coordinate system. $u_l^{c_i}$ may represent a second pixel abscissa of the $l^{th}$ feature point in a camera coordinate system corresponding to the sliding window of the $i^{th}$ frame. $v_l^{c_i}$ may represent a second pixel column coordinate of the $l^{th}$ feature point in the camera coordinate system corresponding to the sliding window of the $i^{th}$ frame. $\lambda_l$ may represent an inverse depth of the $l^{th}$ feature point. The sliding window of the $j^{th}$ frame may correspond to the eighth sliding window. The sliding window of the $i^{th}$ frame may correspond to the ninth sliding window. The $l^{th}$ feature point may represent the target second non-lane line feature point.

Through the above embodiments of the present disclosure, the second non-lane line measurement residual may be calculated, which is convenient for initializing the pose of the movable object.

According to embodiments of the present disclosure, on the basis of the second wheel speedometer scale measurement residual, the second lane line measurement residual and the second non-lane line measurement residual calculated by the above method, these residuals may be combined to construct a graph optimization model as shown in equation (4), so as to determine the initialization pose of the movable object according to the plurality of second real-time measurement residuals.

$$x = \arg\min_x \left\{ \sum \|r_I\|_{P_I}^2 + \sum \|r_l\|_{P_l}^2 + \sum \|r_p\|_{P_p}^2 \right\} \quad (4)$$

In equation (4), $P_l$ may represent a covariance matrix of a residual $r_l$, $P_l$ may represent a covariance matrix of a residual $r_l$, and $P_p$ may represent a covariance matrix of a residual $r_p$.

According to embodiments of the present disclosure, the second vehicle velocity measurement residual and the second IMU measurement residual may also be calculated based on the similar method. The graph optimization model similar to equation (4) may be constructed according to the second wheel speedometer scale measurement residual, the second lane line measurement residual, the second non-lane line measurement residual, the second vehicle velocity measurement residual and the second IMU measurement residual.

According to embodiments of the present disclosure, for the graph optimization model shown in equation (4), a LM method may be used to solve the above equation iteratively, so as to obtain an initialization pose and an angular speedometer bias in the sliding window of each frame. The above equation may be converged quickly by taking the pose obtained by the wheel speedometer integration as an initial value of the pose and using an inverse depth obtained by triangulating a corner point with the initial value of the pose as an initial value of the inverse depth.

Through the above embodiments of the present disclosure, fusing the IMU, the lane line feature, the non-lane line feature, and even the wheel speedometer feature and the vehicle speedometer feature to achieve the initialization of the pose may improve an accuracy of the initialization result.

According to embodiments of the present disclosure, after obtaining the initialization pose, the initialization angular speedometer bias may be estimated. Determining an initialization angular speedometer bias of the movable object according to the second lane line feature information and the second IMU information includes: determining a third calculation value of a second rotation offset formed by an IMU coordinate system at two time instants when sliding windows of two adjacent frames are positioned according to a fifth measurement value of the second rotation offset formed by the IMU coordinate system at the two time instants when the sliding windows of two adjacent frames are positioned and an angular speedometer bias; and determining the initialization angular speedometer bias according to the third calculation value and the fifth measurement value.

According to embodiments of the present disclosure, in a process of visual inertial alignment, the initialization angular speedometer bias may be estimated. In the process of initializing the angular speedometer bias, a third calculation value $q_{b_k}^{b_{k+1}}$ of a second rotation offset formed by the IMU coordinate system at two time instants when sliding windows of two adjacent frames are positioned may be calculated according to an association relationship between lane lines in the sliding windows of the two adjacent frames. A fifth measurement value $\gamma_{b_k}^{b_{k+1}}$ of the second rotation offset formed by the IMU coordinate system at two time instants when sliding windows of two adjacent frames are positioned may be obtained through an IMU integration between the sliding windows of the two adjacent frames. Based on the principle that the two second rotation offsets are the same in theory, equation (5) may be obtained by linearizing an IMU pre-integration.

$$q_{b_k}^{b_{k+1}} = \gamma_{b_k}^{b_{k+1}} \otimes \begin{bmatrix} \frac{1}{2} J_{b_g} \delta b_g \\ 1 \end{bmatrix} \quad (5)$$

In equation (5), the above-mentioned sliding windows of two adjacent frames may include a sliding window of a $k^{th}$ frame and a sliding window of a $(k+1)^{th}$ frame. J may represent a Jacobi matrix.

According to equation (5), an initialization angular speedometer bias $\delta b_g$ may be calculated by using the least squares method combined with a MAP method. Such process may be represented as equation (6).

$$\delta b_g = \arg\min_{\delta b_g} \sum_{k \in B} \left\| 0.5 J_{b_g} \delta b_g - \left( q_{b_k}^{b_{k+1}} \otimes \gamma_{b_k}^{b_{k+1}-1} \right)_{vec} \right\| + \|\delta b_g\|_Q \quad (6)$$

In equation (6), B may represent all image frames corresponding to sliding windows of all frames. Q may represent a covariance matrix.

Through the above embodiments of the present disclosure, the initialization angular speedometer bias may be calculated, which is conductive to the further completion of the initialization of the state vector.

According to embodiments of the present disclosure, determining an initialization wheel speedometer scale and/or an initialization accelerometer bias according to the initialization angular speedometer bias, the second IMU information and the initialization pose includes: in response to the pose vector and the angular speedometer bias being initialized, determining an IMU pre-integration model according to a first target velocity vector corresponding to a tenth sliding window, a second target velocity vector corresponding to an eleventh sliding window, a time difference formed by a time instant corresponding to the tenth sliding window and a time instant corresponding to the eleventh sliding window, a gravity vector, a wheel speedometer scale, a pose vector corresponding to the tenth sliding window, a pose vector corresponding to the eleventh sliding window, a rotation corresponding to the tenth sliding window, and a rotation corresponding to the eleventh sliding window; determining a least square optimization model corresponding to the IMU pre-integration model, where the least square optimization model includes at least one selected from: a velocity vector to be estimated, a gravity vector to be estimated, or a wheel speedometer scale to be estimated; and determining the initialization wheel speedometer scale and/or the initialization accelerometer bias according to a gravity vector of a preset length, the IMU pre-integration model, and the least square optimization model.

According to embodiments of the present disclosure, after estimating the initialization angular velocity bias of the IMU, the IMU may be re-integrated to obtain more accurate interframe IMU pre-integration values $$\alpha_{b_{k+1}}^{b_k} \text{ and } \beta_{b_{k+1}}^{b_k},$$

as shown in equation (7).

$$\alpha_{b_{k+1}}^{b_k} = -\Delta t_k v_{b_k}^{b_k} + \frac{1}{2} R_w^{b_k} \Delta t_k^2 g^w + R_w^{b_k} \left( p_{b_{k+1}}^w - p_{b_k}^w \right) s \quad (7)$$

$$\beta_{b_{k+1}}^{b_k} = -v_{b_k}^{b_k} + R_w^{b_k} R_{b_{k+1}}^w v_{b_{k+1}}^{b_{k+1}} + R_w^{b_k} \Delta t_k g^w$$

In equation (7), $t_k$ may represent a time difference between a time instant corresponding to the sliding window of the $k^{th}$ frame and a time instant corresponding to the sliding window of the $(k+1)^{th}$ frame. $v_{b_k}^{b_k}$ may represent a representation of a first target velocity vector corresponding to the sliding window of the $k^{th}$ frame in an IMU coordinate system corresponding to the sliding window of the $k^{th}$ frame. $v_{b_{k+1}}^{b_{k+1}}$ may represent a representation of a second target velocity vector corresponding to the sliding window of the $(k+1)^{th}$ frame in an IMU coordinate system corresponding to the sliding window of the $(k+1)^{th}$ frame. $g^w$ may represent a representation of gravity in the world coordinate system. s may represent the wheel speedometer scale. The sliding window of the $k^{th}$ frame may correspond to the tenth sliding window. The sliding window of the $(k+1)^{th}$ frame may correspond to the eleventh sliding window. $p_{b_k}^{w}$ may represent a pose vector corresponding to the tenth sliding window. $p_{b_{k+1}}^{w}$ may represent a pose vector corresponding to the eleventh sliding window. $R_w^{b_k}$ may represent a rotation corresponding to the tenth sliding window. $R_{b_{k+1}}^{w}$ may represent a rotation corresponding to the eleventh sliding window.

According to embodiments of the present disclosure, poses corresponding to the sliding windows of corresponding frames in equation (7) may be determined by a pose of a BA optimized image frame. The IMU pre-integration model may be obtained by converting equation (7) into a matrix representation, which may be represented as equation (8).

$$A_k x_k = B_k \quad (8)$$

$$A_k = \begin{bmatrix} -\Delta t_k I_{3\times 3} & 0_{3\times 3} & \frac{1}{2} R_w^{b_k} \Delta t_k^2 & R_w^{b_k}(p_{b_{k+1}}^w - p_{b_k}^w) \\ -I_{3\times 3} & R_w^{b_k} R_{b_{k+1}}^w & R_w^{b_k} \Delta t_k & 0_{3\times 1} \end{bmatrix}_k,$$

$$B_k = \begin{bmatrix} \alpha_{b_{k+1}}^{b_k} \\ \beta_{b_{k+1}}^{b_k} \end{bmatrix},$$

$$x_k = \begin{bmatrix} v_{b_k}^{b_k} \\ v_{b_{k+1}}^{b_{k+1}} \\ g^w \\ s \end{bmatrix}$$

In equation (8), $I_{3\times 3}$ may represent a matrix of 3×3. $O_{3\times 3}$ may represent a zero matrix of 3×3.

According to embodiments of the present disclosure, the MAP method may be used to solve estimated values of the velocity, gravity and the wheel speedometer scale. On the basis of equation (8), it may be determined that a corresponding variable X to be estimated may be represented as $X=[v_{b_0}^{b_0 T} v_{b_1}^{b_1 T} \ldots v_{b_k}^{b_k T} g^{wT} s]^T$. A least squares optimization model corresponding to the IMU pre-integration model may be obtained based on the variable X to be estimated, which may be represented as equation (9).

$$X = \arg\min_x \sum_{k \in B} \|A_k x_k - b_k\| + \|s - 1\|_P \quad (9)$$

In equation (9), B may represent all image frames corresponding to sliding windows of all frames. k may represent an image frame corresponding to the sliding window of the $k^{th}$ frame. P may represent a covariance matrix.

According to embodiments of the present disclosure, after the estimated values of the velocity, gravity and the wheel speedometer scale are obtained by solving equations (7) to (9), a process of optimizing gravity, the velocity and the wheel speedometer scale may be carried out. In the process of optimizing gravity, the velocity and the wheel speedometer scale, a length of gravity may be set as a fixed value, and a direction of gravity may be optimized. A gravity vector of a preset length may be represented as equation (10).

$$g^w = \|g\| \bar{g}^w + w_1 b_1 + w_2 b_2 \quad (10)$$

In equation (10), $\|g\|$ may represent a preset length of gravity. $\bar{g}^w$ may represent a unit direction vector of gravity. $w_1$ and $w_2$ are coefficients. $b_1$ and $b_2$ may represent a pair of orthogonal bases of a spherical tangent space where gravity is located.

According to embodiments of the present disclosure, equation (10) may be brought into the equation (8) and the equation (9) to obtain an optimization problem for the variable to be estimated, which may be represented as equation (11).

$$X = \begin{bmatrix} v_{b_0}^{b_0 T} & v_{b_1}^{b_1 T} & \ldots & v_{b_k}^{b_k T} & w_1 & w_2 & s \end{bmatrix}^T \quad (11)$$

$$X = \arg\min_X \sum_{k \in B} \|B_k x_k - d_k\| + \|s - 1\|_P$$

In equation (11), $B_k x_k - d_k$ may represent a linear least squares form of the optimization problem. P may represent a prior covariance matrix of the wheel speedometer scale.

According to embodiments of the present disclosure, processes of optimizing gravity and the wheel speedometer scale and estimating the acceleration bias may be carried out based on equation (11). In this part, only gravity, the wheel speedometer scale and the acceleration bias may be estimated. The velocity is needed to eliminate according to equation (7). A representation form of gravity may be the same as in equation (10). Every three adjacent image frames may obtain an equation shown in equation (12).

$$-\Delta t_k v_{b_k}^{b_k} + \frac{1}{2} R_w^{b_k} \Delta t_k^2 M\eta + R_w^{b_k}(p_{b_{k+1}}^w - p_{b_k}^w)s = \alpha_{b_{k+1}}^{b_k} - \frac{1}{2} R_w^{b_k} \Delta t_k^2 g_0 \quad (12)$$

$$-v_{b_k}^{b_k} + R_w^{b_k} R_{b_{k+1}}^w v_{b_{k+1}}^{b_{k+1}} + R_w^{b_k} \Delta t_k g^w = \beta_{b_{k+1}}^{b_k}$$

$$-\Delta t_{k+1} v_{b_{k+1}}^{b_{k+1}} + \frac{1}{2} R_w^{b_{k+1}} \Delta t_{k+1}^2 M\eta + R_w^{b_{k+1}}(p_{b_{k+2}}^w - p_{b_{k+1}}^w)s =$$

$$\alpha_{b_{k+2}}^{b_{k+1}} - \frac{1}{2} R_w^{b_{k+1}} \Delta t_{k+1}^2 g_0$$

In equation (12), M may represent a constant matrix. $\eta$ may represent a state variable. $g_0$ may represent an initial value of gravity.

According to embodiments of the present disclosure, as a bias of the IMU is usually small, a pre-integration result is linearized to obtain a form shown in equation (13).

$$\alpha_{b_{k+1}}^{b_k} = \hat{\alpha}_{b_{k+1}}^{b_k} + J_{b_\alpha}^{a_k} \delta b_a$$

$$\alpha_{b_{k+2}}^{b_{k+1}} = \hat{\alpha}_{b_{k+2}}^{b_{k+1}} + J_{b_\alpha}^{a_{k+1}} \delta b_a$$

$$\beta_{b_{k+1}}^{b_k} = \hat{\beta}_{b_{k+1}}^{b_k} + J_{b_\alpha}^{\beta_k} \delta b_a \quad (13)$$

In equation (13), $\alpha_k$ may represent $\alpha_{b_{k+1}}^{k_k}$. $\alpha_{k+1}$ may represent $\alpha_{b_{k+1}}^{b_{k+1}}$. $\beta_k$ may represent $\beta_{b_{k+1}}^{b_k}$. $b_a$ may represent an accelerometer bias. $J_{b_\alpha}^{a_k}$ may represent a Jacobi matrix of $\alpha_{b_{k+1}}^{b_k}$ with respect to $b_a$, $J_{b_\alpha}^{a_{k+1}}$ may represent a Jacobi matrix of $\alpha_{b_{k+2}}^{b_{k+1}}$ with respect to $b_a$. $J_{b_\alpha}^{\beta_k}$ may be a Jacobi matrix of $\beta_{b_{k+1}}^{b_k}$ with respect to $b_a$.

According to embodiments of the present disclosure, equation (14) may be obtained by introducing the linearized form (13) into equation (12) and using the MAP method. For example, the initialization gravity, the initialization wheel speedometer scale, and the initialization accelerometer bias may be estimated by solving equation (14).

$$X = [\eta^T \ s \ \delta b_a^T]^T \quad (14)$$

$$X = \arg\min_X \sum_{k \in B} \|F_k X - h_k\| + \|s - 1\|_P + \|\delta b_a\|_Q$$

In equation (14), $F_k X - h_k$ may represent a least squares form.

Through the above embodiments of the present disclosure, the initialization wheel speedometer scale and the initialization accelerometer bias may be calculated more accurately, so as to achieve the initialization of the wheel speedometer scale and the accelerometer bias, thereby achieving the initialization of all the state vectors.

According to embodiments of the present disclosure, after all the state vectors of the movable object are initialized, the state vectors of the movable object may be updated according to the kinematic model of the IMU and the plurality of first real-time measurement residuals. Before this, for example, the plurality of first real-time measurement residuals may be determined based on the plurality of first sensor information of the movable object detected.

According to embodiments of the present disclosure, the first lane line measurement residual may represent a distance residual formed by a line corresponding to a target first lane line feature point at a first sliding window and a feature point position corresponding to the target first lane line feature point at a second sliding window, and a time instant corresponding to the first sliding window is earlier than a time instant corresponding to the second sliding window. Determining a plurality of first real-time measurement residuals according to a plurality of first sensor information of a movable object detected includes: determining a first pose corresponding to a first image frame and a second pose corresponding to a second image frame, where the first image frame corresponds to the first sliding window, and the second image frame corresponds to the second sliding window; determining a first position information of the target first lane line feature point in a normalization plane corresponding to the second image frame; and determining the first lane line measurement residual according to the first pose, the second pose, the first position information, and a predefined linear model.

According to embodiments of the present disclosure, for example, the above-mentioned first lane line measurement residual $d_{ij}^k$ may may be calculated based on equation (15).

$$d_{ij}^k \approx d + J_j^{T_j} \delta T_j + J_i^{T_i} \delta T_i + J_p \delta p_k^{t_i} \quad (15)$$

In equation (15), $d_{ij}^k$ may represent a distance residual constructed by a point of the $k^{th}$ lane line according to an image frame corresponding to the sliding window of the $i^{th}$ frame and an image frame corresponding to the sliding window of the $j^{th}$ frame. d is a linear representation form. $T_j$ may represent a first pose corresponding to a first image frame corresponding to the sliding window of the $j^{th}$ frame. $J_j^{T_j}$ may represent a Jacobi matrix of the residual $d_{ij}^k$ with respect to a first image frame pose corresponding to the sliding window of the $i^{th}$ frame. $T_i$ may represent a second pose corresponding to a second image frame corresponding to the sliding window of the $i^{th}$ frame. $J_i^{T_i}$ may represent a Jacobi matrix of the residual $d_{ij}^k$ with respect to a second image frame pose corresponding to the sliding window of the $i^{th}$ frame. $p_k^{t_i}$ may represent a first position information of a feature point of the $k^{th}$ lane line in a normalization plane corresponding to the sliding window of the $i^{th}$ frame. $J_p$ may represent a Jacobi matrix of the residual $d_{ij}^k$ with respect to the $k^{th}$ feature point $p_k^{t_i}$. The sliding window of the $j^{th}$ frame may correspond to the first sliding window. The sliding window of the $i^{th}$ frame may correspond to the second sliding window. $p_k^{t_i}$ may represent the target first lane line feature point. As a position of the point is not estimated, a left null space of $J_p$ may be used to eliminate an item related to the position of the point.

Through the above embodiments of the present disclosure, the first lane line measurement residual may be calculated. Performing the visual inertial odometer positioning based on the first lane line measurement residual in combination with the first real-time measurement residuals of other sensor information may obtain the smooth local positioning result with the high lateral accuracy.

According to embodiments of the present disclosure, the first non-lane line measurement residual may represent a re-projection residual of a target first non-lane line feature point in a third image frame corresponding to a third sliding window. Determining a plurality of first real-time measurement residuals according to a plurality of first sensor information of a movable object detected includes: determining a first measurement value of a second position information of the target first non-lane line feature point in a normalization plane corresponding to the third image frame according to a world coordinate information of the target first non-lane line feature point in a world coordinate system; determining a first rotation and a first translation between the world coordinate system and an IMU coordinate system; determining a first calculation value of the second position information of the target first non-lane line feature point in the normalization plane corresponding to the third image frame according to the world coordinate information, the first rotation, the first translation, an extrinsic parameter of a camera, and an extrinsic parameter of the IMU; and determining the first non-lane line measurement residual according to the first measurement value and the first calculation value.

According to embodiments of the present disclosure, triangulating the feature point by using the pose of the image frame corresponding to the sliding window according to an association relationship of the point pair, may obtain a coordinate $p^w$ of the feature point in the world coordinate system. Based on this, a re-projection residual $r_p$ may be constructed, as shown in equation (16).

$$r_p = \hat{p}_k^c - h(p_k^c) \quad (16)$$

$$h\left(\begin{bmatrix} p_x \\ p_y \\ p_z \end{bmatrix}\right) = \begin{bmatrix} \dfrac{p_x}{p_z} \\ \dfrac{p_y}{p_z} \end{bmatrix}$$

$$p_k^c = R_b^c R_w^i (p_k^w - p_i^w) + p_b^c$$

In equation (16), $\hat{p}_k^c$ may represent a first measurement value of a second position information of the $k^{th}$ feature point in a normalization plane of a third image frame corresponding to a sliding window of a $c^{th}$ frame. h (•) may represent a projection of a 3D coordinate in the camera coordinate system to a camera normalization plane. $p_k^c$ may represent a coordinate of the $k^{th}$ feature point in an image coordinate system of the third image frame corresponding to the sliding window of the $c^{th}$ frame, which may correspond to a first calculation value of the above-mentioned second position information. $p_k^w$ may represent a world coordinate information of the $k^{th}$ feature point in the world coordinate system. $R_w^i$ may represent a first rotation between the IMU coordinate system and the world coordinate system. $p_i^w$ may represent a first translation between the IMU coordinate system and the world coordinate system.

According to embodiments of the present disclosure, equation (16) may also be linearized to obtain an error state equation, as shown in equation (17). $\tilde{z}_1$ determined by equation (17) may be applied to a filtering process of MSCKF to achieve a real-time update of the state vector.

$$\tilde{z}_1 \approx H_x \delta x + H_p \delta p^w + n_2 \qquad (17)$$

In equation (17), $\tilde{z}_1$ may represent a measurement residual. x may represent all the state vectors. $H_x$ may represent a Jacobi matrix of the residual $\tilde{z}_1$ with respect to the state vector. $H_p$ may represent a Jacobi matrix of the residual $\tilde{z}_1$ with respect to a feature point coordinate. $n_2$ may represent a noise. As a position of the feature point in the world coordinate system is not estimated, a left null space of $H_p$ may be used to eliminate an item related to a position variable of the feature point.

Through the above embodiments of the present disclosure, the first non-lane line measurement residual may be calculated. Performing the visual inertial odometer positioning based on the first non-lane line measurement residual in combination with the first real-time measurement residuals s of other sensor information may obtain the smooth local positioning result with the high lateral accuracy.

According to embodiments of the present disclosure, the first wheel speedometer scale measurement residual may represent a scale measurement residual for each wheel of the movable object. Determining a plurality of first real-time measurement residuals according to a plurality of first sensor information of a movable object detected includes: determining, for each wheel of the movable object, the scale measurement residual for the wheel, according to a pose between a world coordinate system and an IMU system, a velocity of the IMU in the world coordinate system, a displacement between a coordinate system of the wheel and the IMU coordinate system, an angular velocity of the wheel detected by the IMU, a scale of the wheel, radius of the wheel, and a velocity of the wheel.

According to embodiments of the present disclosure, the first vehicle velocity measurement residual may represent a measurement residual for a moving velocity of the movable object. Determining a plurality of first real-time measurement residuals according to a plurality of first sensor information of a movable object detected includes: determining the first vehicle velocity measurement residual according to an average velocity of the movable object within adjacent time instants and a velocity of the IMU in a world coordinate system.

According to embodiments of the present disclosure, the first wheel speedometer scale measurement residual and the first vehicle velocity measurement residual may be calculated together. Residuals may be constructed respectively for each wheel in an available object. For example, residuals may be constructed respectively for left and right wheels to estimate left and right wheel scales. Adopting an update at the same frequency as the IMU or an update at the same frequency as the image frame to obtain a calculation equation of a residual e, as shown in equation (18).

$$e = \begin{bmatrix} e_l \\ e_r \\ e_v \end{bmatrix} = \begin{bmatrix} R_G^I v^G - R_{lw}^I(s_l r_l v_l + R_I^{lw} \omega_\times t_l) \\ R_G^I v^G - R_{rw}^I(s_r r_r v_r + R_I^{rw} \omega_\times t_r) \\ \bar{v} - |v^G| \end{bmatrix} \qquad (18)$$

In equation (18), $e_l$ may represent a residual for the left wheel. $e_r$ may represent a residual for the right wheel. $e_v$ may represent a residual of the vehicle velocity. $R_G^I$ may represent a relevant pose between the world coordinate system and the IMU coordinate system. $v^G$ may represent a representation of a velocity of the IMU in the world coordinate system. $s_l$ may represent a scale of the left wheel. $r_l$ may represent a radius of the wheel. $v_l$ may represent an angular velocity of the left wheel. $R_I^{bw}$ may represent a rotation between a left wheel coordinate system and the IMU coordinate system. $\omega_x$ may represent an angular velocity of the left wheel detected by the IMU. $t_l$ may represent a displacement between the IMU coordinate system and the left wheel coordinate system. Correspondingly, related parameters of the right wheel have corresponding definitions. $\bar{v}$ may represent an average velocity.

Through the above embodiments of the present disclosure, the first wheel speedometer scale measurement residual and the first vehicle speedometer measurement residual may be calculated. Performing the visual inertial odometer positioning based on the first wheel speedometer scale measurement residual and the first vehicle speedometer measurement residual in combination with the first real-time measurement residuals of other sensor information may obtain the smooth local positioning result with the high lateral accuracy.

According to embodiments of the present disclosure, before calculating the first IMU measurement residual, it may be determined whether the movable object is in a stationary state or not by the wheel velocity, the vehicle velocity and the IMU. Then, a first IMU measurement residual of the movable object in the stationary state is calculated, which may include a pose measurement residual and a velocity measurement residual. A stationary detection may be completed through a $x^2$ detection, where x is a predefined threshold.

For example, the wheel velocity and the vehicle velocity may be used for detection. A ZUPT (Zero Velocity Update) residual may be obtained by setting states of velocity $v^G$ in the wheel velocity measurement residual and the vehicle velocity measurement residual to 0, as shown in equation (19).

$$\tilde{e} = \begin{bmatrix} e_l \\ e_r \\ e_v \end{bmatrix} = \begin{bmatrix} -R_{lw}^I(s_l r v_l + R_I^{lw} \omega_\times t_l) \\ -R_{rw}^I(s_r r v_r + R_I^{rw} \omega_\times t_r) \\ \bar{v} \end{bmatrix} \qquad (19)$$

According to equation (19), if a residual $\tilde{e}$ meets $\tilde{e}^T(H_1 P_1 H_1^T + \alpha_1 R_1)^{-1}$ and $\tilde{e} < x_1^2$, it may be determined that the movable object is in the stationary state.

For example, the IMU may also be used for detection. A ZIHR (Zero Velocity Update) residual may be obtained by setting states of acceleration and angular velocity of the movable object to 0, as shown in equation (20).

$$z_2 = \begin{bmatrix} -(a_m - b_a - R_{ws}^I g) \\ -(\omega_m - b_g) \end{bmatrix} \qquad (20)$$

In equation (20), $\tilde{z}_2$ may represent a measurement residual of the IMU. $\alpha_m$ may represent an acceleration measurement value of the IMU. $b_a$ may represent the accelerometer bias of the IMU. $\omega_m$ may represent an angular velocity measurement value of the IMU. $b_g$ may represent the angular speedometer bias of the IMU. $R_w^I$ may represent a second rotation between the IMU coordinate system and the world coordinate system. g may represent a gravity vector.

According to equation (20), if the residual $\tilde{z}_2$ meets $\tilde{z}_2^T (H_2 P_2 H_2^T + \alpha_2 R_2)^{-1}$ and $\tilde{z}_2 < x_2^2$, it may be determined that the movable object is in the stationary state.

In equations (19) and (20), $H_1$ and $H_2$ are coefficient matrices. $P_1$ and $P_2$ are covariance matrices of the state. $x_1$ and $x_2$ are thresholds. $\alpha_1$ and $\alpha_2$ are constant coefficients. $R_1$ may represent a covariance matrix of $\tilde{e}$. $R_2$ may represent a covariance matrix of $\tilde{z}_2$.

According to embodiments of the present disclosure, the first IMU measurement residual includes a pose measurement residual for the IMU of the movable object in a stationary state. Determining a plurality of first real-time measurement residuals according to a plurality of first sensor information of a movable object detected includes: determining a first heading angle corresponding to a fourth image frame collected by the movable object in the stationary state and a second heading angle corresponding to a fifth image frame collected by the movable object in the stationary state, where the fourth image frame corresponds to a fourth sliding window, the fifth image frame corresponds to a fifth sliding window, and the fourth sliding window is adjacent to the fifth sliding window; determining, for the movable object in the stationary state, a second translation between an IMU coordinate system at a time instant when the fourth sliding window is positioned and a world coordinate system, and a third translation between an IMU coordinate system at a time instant when the fifth sliding window is positioned and the world coordinate system; and determining the pose measurement residual according to the first heading angle, the second heading angle, the second translation, and the third translation.

According to embodiments of the present disclosure, in a case that it is determined that the movable object is in the stationary state, a pose measurement residual $r_1$ may be constructed, as shown in equation (21).

$$r_1 = \begin{bmatrix} \theta_{yaw}^{i+1} - \theta_{yaw}^i \\ p_W^{i+1} - p_W^i \end{bmatrix} \quad (21)$$

In equation (21), $r_1$ may represent the pose measurement residual. $\theta_{yaw}^i$ may represent a first heading angle corresponding to a fourth image frame corresponding to the sliding window of the $i^{th}$ frame. $\theta_{yaw}^{i+1}$ may represent a second heading angle corresponding to a fifth image frame corresponding to the sliding window of the $(i+1)^{th}$ frame. The sliding window of the $i^{th}$ frame may correspond to the fourth sliding window.

The sliding window of the $(i+1)^{th}$ frame may correspond to the fifth sliding window. $p_w^i$ may represent a second translation between an IMU coordinate system corresponding to the sliding window of the $i^{th}$ sliding window and the world coordinate system. $p_w^{i+1}$ may represent a third translation between an IMU coordinate system corresponding to the sliding window of the $(i+1)^{th}$ sliding window and the world coordinate system.

Through the above embodiments of the present disclosure, the first IMU measurement residual may be calculated. Performing the visual inertial odometer positioning based on the first IMU measurement residual in combination with the first real-time measurement residuals of other sensor information may obtain the smooth local positioning result with the high lateral accuracy.

According to embodiments of the present disclosure, the first IMU measurement residual includes a velocity measurement residual for the IMU of the movable object in a stationary state. Determining a plurality of first real-time measurement residuals according to a plurality of first sensor information of a movable object detected includes: determining an acceleration measurement value of the IMU of the movable object in the stationary state, an accelerometer bias of the IMU of the movable object in the stationary state, an angular velocity measurement value of the IMU of the movable object in the stationary state, and an angular speedometer bias of the IMU of the movable object in the stationary state; and determining the velocity measurement residual according to the acceleration measurement value, the accelerometer bias, the angular velocity measurement value, the angular speedometer bias, a second rotation between an IMU coordinate system and a world coordinate system, and a gravity vector of the movable object in the stationary state.

According to embodiments of the present disclosure, in the case that it is determined that the movable object is in the stationary state, a velocity measurement residual $r_2$ may be constructed, as shown in equation (22).

$$r_2 = \begin{bmatrix} -(a_m - b_a - R_w^I g) \\ -(\omega_m - b_g) \end{bmatrix} \quad (22)$$

In equation (22), $r_2$ may represent a measurement residual of the IMU.

Through the above embodiments of the present disclosure, the first IMU measurement residual may be calculated. Performing the visual inertial odometer positioning based on the first IMU measurement residual in combination with the first real-time measurement residuals of other sensor information may obtain the smooth local positioning result with the high lateral accuracy.

According to embodiments of the present disclosure, the kinematic model includes a rotation state model, a translation state model, a velocity state model, an accelerometer bias state model and an angular speedometer bias state model. Updating a state vector of the movable object according to a kinematic model of an IMU and the plurality of first real-time measurement residuals includes: determining a covariance model of the IMU at a current time instant determined under a condition of a previous time instant, according to the rotation state model, the translation state model, the velocity state model, the accelerometer bias state model, and the angular speedometer bias state model detected at the previous time instant; and determining a state vector at the current time instant according to a state vector at the current time instant determined under the condition of the previous time instant, the plurality of first real-time measurement residuals, a covariance of the IMU, and a measurement covariance determined at the current time instant, where the measurement covariance includes covariances related to all physical quantities detected by the movable object.

According to embodiments of the present disclosure, the kinematic model of the IMU, for example, may be represented as equation (23).

$$\dot{q}_w^I = \frac{1}{2}\begin{bmatrix} -\lfloor\omega(t)\rfloor_\times & \omega(t) \\ -\omega^T(t) & 0 \end{bmatrix} q_w^I \quad (23)$$

$$\dot{p}_w^I(t) = v_I^w(t)$$

$$\dot{v}_I^w(t) = R_I^w a(t)$$

$$\dot{b}_g(t) = n_{wg}$$

$$\dot{b}_a(t) = n_{wa}$$

In equation (23), $$\alpha(t)=\alpha_m(t)-R_w^I g - b_a(t) - n_a(t)$$

$$\omega(t)=\omega_m(t)-b_g(t)-n_g(t)$$

where $\dot{q}_w^I$ may represent a rotation state model, $\dot{p}_I^w$ may represent a translation state model, $\dot{v}_I^w$ may represent a velocity state model, $b_g$ may represent an angular speedometer bias state model, $b_a$ may represent an accelerometer bias state model, $\omega(t)$ may represent an angular velocity at time instant t, $v_I^w$ (t) may represent a velocity at time instant t, $\alpha(t)$ may represent an acceleration at time instant t, $R_w^I$ may represent a rotation between the IMU coordinate system and the world coordinate system, $\alpha_m$ (t) may represent an acceleration measurement value of the IMU at time instant t, g may represent gravity, $n_a$ (t) may represent a measurement noise of an IMU accelerometer at time instant t, $n_g$ (t) may represent a measurement noise of an IMU angular speedometer at time instant t, $b_a$ (t) may represent an accelerometer bias at time instant t, and $b_g$ (t) may represent an angular speedometer bias at time instant t.

According to embodiments of the present disclosure, a predicted pose of the current frame may be obtained by integrating equation (23), and a state transition model may be obtained by discretizing a differential equation of equation (23), which may be represented as equation (24).

$$\tilde{x}_I(t_{k+1})=\Phi(t_{k+1},t_k)\tilde{x}_I(t_k)+G_k n_1 \quad (24)$$

In equation (24), $\tilde{x}_I$ ($t_{k+1}$) may represent an error state of the IMU at time instant t+1 determined under a condition of time instant t. $\Phi(t_{k+1}, t_k)$ may represent a state transition matrix from a time instant k to a time instant k+1. $G_k$ may represent a coefficient matrix of the noise. $n_1$ may represent a measurement noise.

According to embodiments of the present disclosure, the IMU covariance model, for example, may be represented as equation (25).

$$P_{k+1|k}=\Phi(t_{k+1},t_k)P_{k|k}\Phi^T(t_{k+1},t_k)+G_k Q G_k^T \quad (25)$$

In equation (25), $p_{k+1|k}$ may represent a covariance of a time instant k+1 obtained under a condition of the time instant k. Q may represent a covariance of a measurement noise.

According to embodiments of the present disclosure, after all the first real-time measurement residuals are calculated, the error-state Kalman filtering method may be used to perform a measurement update on the state vector of a movable object system. For example, a measurement update process may be achieved based on the following equation (26).

$$x_{k+1|k+1}=x_{k+1|k}\oplus P_{k+1|k}H_{k+1}^T(H_{k+1}P_{k+1|k}H_{k+1}^T+R_{k+1})^-$$
$$1 r_z$$

$$P_{k+1|k+1}=P_{k+1|k}-P_{k+1|k}H_{k+1}^T(H_{k+1}P_{k+1|k}H_{k+1}^T+R_{k+1})^-$$
$$1 H_{k+1}P_{k+1|k} \quad (26)$$

In equation (26), $x_{k+1|k+1}$ may represent a state of the system at current time instant after updating. $P_{k+1|k+1}$ may represent a covariance of the state of the system at current time instant after updating, and the covariance may be obtained recursively by combining equation (24) and equation (25). $H_{k+1}$ may represent a Jacobi matrix of the measurement with respect to the error state. $r_z$ may represent all the first real-time measurement residuals. $R_{k+1}$ may represent a covariance of the measurement at current time instant. The measurement may include a representation of all the states of the movable object.

Through the above embodiments of the present disclosure, the IMU, the lane line feature, the non-lane line feature, and even the wheel speedometer feature and the vehicle speedometer feature may be fused to achieve the visual inertial odometer positioning, thereby obtaining the smooth local positioning result with the high lateral accuracy.

According to embodiments of the present disclosure, a sliding window used to real-time detect the plurality of first sensor information is stored in a sequence of sequential sliding windows used to store sliding windows of a preset number of frames. The positioning method based on a lane line and a feature point may further include: for a sliding window of each frame stored in the sequence of sequential sliding windows, determining a sliding window meeting a preset condition as a key frame; in response to a twelfth sliding window containing the updated state vector being received, determining, from the sequence of sequential sliding windows, a thirteenth sliding window closest to a time instant corresponding to the twelfth sliding window and a fourteenth sliding window farthest from the time instant corresponding to the twelfth sliding window, where the time instant corresponding to the twelfth sliding window is a current time instant; in a case that the thirteenth sliding window belongs to the key frame, deleting the fourteenth sliding window from the sequence of sequential sliding windows, and storing the twelfth sliding window in the sequence of sequential sliding windows; and in a case that the thirteenth sliding window does not belong to the key frame, deleting the thirteenth sliding window from the sequence of sequential sliding windows, and storing the twelfth sliding window in the sequence of sequential sliding windows.

According to embodiments of the present disclosure, after detecting a plurality of first sensor information according to a sliding window of a new frame and completing a real-time update of the state vector according to the plurality of first sensor information, for example, a certain frame in the sequence of timing sliding windows may be removed accordingly. When a penultimate frame in the sequence of timing sliding window is not the key frame, the penultimate frame may be removed; otherwise, the oldest frame in the sequence of timing sliding windows may be removed.

Through the above embodiments of the present disclosure, on a basis of maintaining a fixed number of states in the sequence of timing sliding windows, a proportion of key frames in the sequence of temporal sliding windows may be increased, which is conducive to saving computing resources and improving computing accuracy.

According to embodiments of the present disclosure, determining a sliding window meeting a preset condition as a key frame may include: determining a pose offset between a pose vector corresponding to the twelfth sliding window and a pose vector corresponding to the thirteenth sliding window; and in response to the pose offset being greater than a preset threshold, determining the twelfth sliding window as the key frame.

According to embodiments of the present disclosure, in a process of real-time updating the state vector based on the filtering method, a sequence of timing sliding windows of the filter may be composed of two parts: a fix window and an optimization window. An information corresponding to sliding windows of first few frames may be stored in the fix window, and a pose corresponding to a sliding window located in the fix window will no longer be updated. Remaining key frames may be stored in the optimization window, and a pose corresponding to a sliding window located in the optimization window may be updated continuously.

According to embodiments of the present disclosure, during the system operation, a new key frame may be created in a following situation: when a rotation or translation transformation between adjacent frames, that is, the pose offset, is greater than the preset threshold, the new key frame may be created.

According to embodiments of the present disclosure, during the system operation, the new key frame may also be created in a following situation: when a feature point parallax between adjacent frames is greater than a threshold, the new key frame is created; when the number of pairs of matching feature points between adjacent frames is less than a threshold, the new key frame is created.

Through the above embodiments of the present disclosure, the proportion of key frames in the sequence of timing sliding window may be effectively increased, so as to improve a positioning accuracy.

Figure 5:
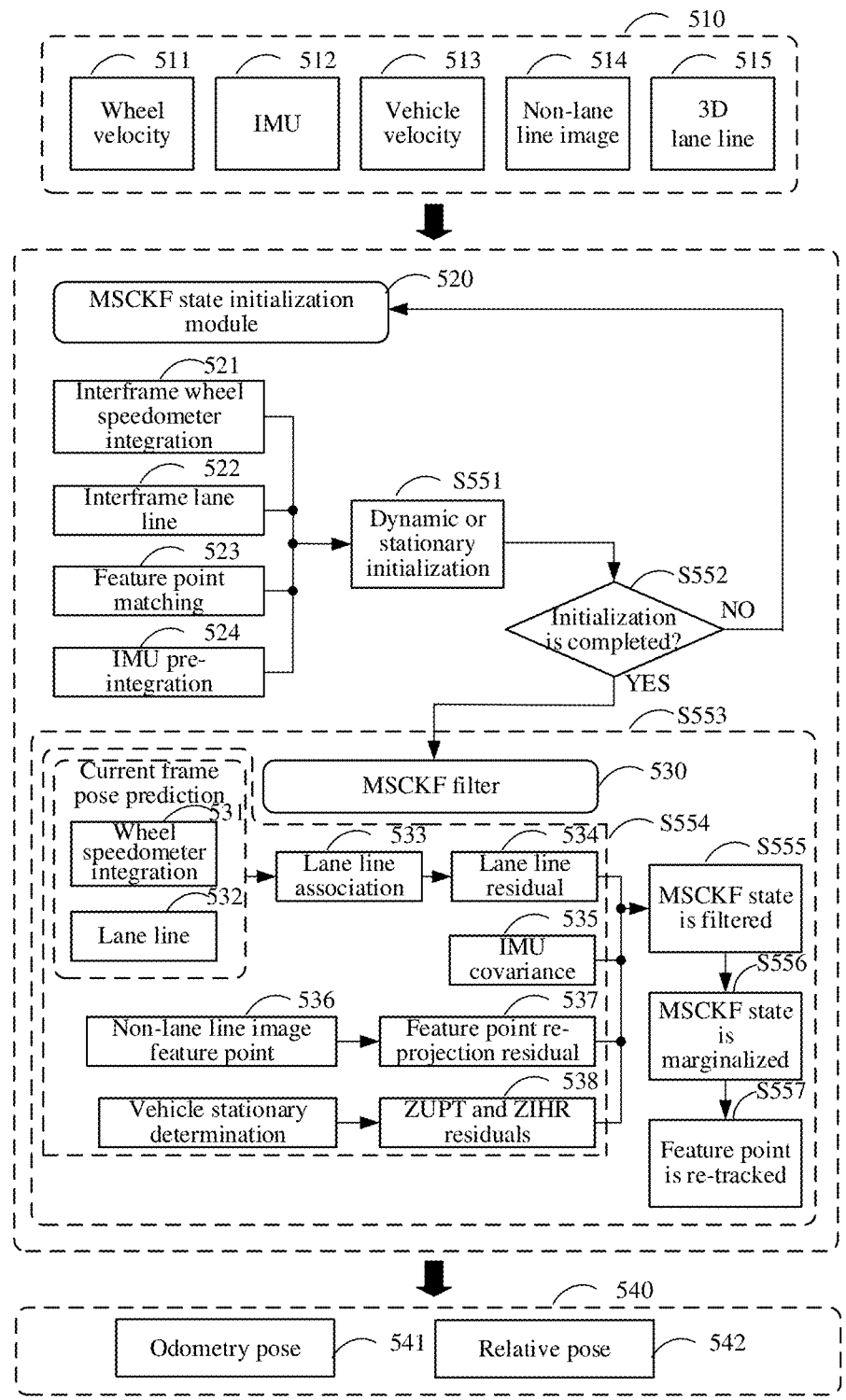
FIG. 5 schematically shows an operating principle diagram of a visual inertial odometer based on a lane line and a feature point according to embodiments of the present disclosure.

FIG. 5 schematically shows an operating principle diagram of a visual inertial odometer based on a lane line and a feature point according to embodiments of the present disclosure.

As shown in FIG. 5, a visual inertial odometer architecture 500 based on the lane line and the feature point may include an input module 510, an MSCKF state initialization module 520, an MSCKF filter module 530, and an output module 540.

According to embodiments of the present disclosure, the input module 510 may receive a plurality of sensor information in real-time based on the same frequency or different frequencies, such as a wheel velocity information 511, an IMU information 512, a vehicle velocity information 513, a non-lane line image information 514 and a 3D lane line information 515, and may not be limited thereto.

According to embodiments of the present disclosure, as a coordinate system of an odometer module adopts a local coordinate system, it is necessary to estimate an initialization state of a system when the entire system is just started, including the initialization of IMU biases (including the angular speedometer bias and the accelerometer bias), the velocity, gravity, the wheel speedometer scale and other state vectors. An initialization process includes operations S551 to S553.

In operation S551, the MSCKF state initialization module 520 fuses a plurality of sensor information, such as an interframe wheel speedometer integration 521, an interframe lane line information 522, a non-lane line image feature point matching information 523, and an IMU pre-integration information 524, to perform dynamic or stationary initialization.

In operation S552, it may be determined whether the initialization is completed or not. If the initialization is completed, operation S553 is performed. If the initialization is not completed, operation S551 is performed.

In operation S553, the MSCKF filter module 530 is entered. In this operation, initialization states may also be output, including an initialization IMU bias, an initialization velocity, an initialization gravity, an initialization wheel speedometer scale, etc.

According to embodiments of the present disclosure, after the initialization of the state vector of the system is completed, the IMU bias, the velocity and the wheel speedometer scale in the MSCKF filter 530 may be assigned corresponding initial values. The MSCKF filter 530 including the initialization states may receive the plurality of sensor information such as the wheel speed information 511, the IMU information 512, the vehicle velocity information 513, the non-lane line image information 514, and the 3D lane line information 515 in real-time, and process the plurality of sensor information to output an estimated pose of the movable object. A processing flow of the MSCKF filter 530 may include operations S554 to S557.

In operation S554, the second real-time measurement residual is constructed. In this operation, the odometer may receive information from each sensor in real-time, and construct corresponding residuals by processing the sensor information. For example, such operation may include processing a wheel speedometer integration 531 and a lane line information 532, determining a lane line association relationship 533, and constructing a lane line residual 534; determining an IMU covariance 535 by IMU recursion and covariance update; constructing a feature point re-projection residual 537 by extracting and matching a non-lane line image feature point 536; and constructing ZUPT and ZIHR residuals 538 when the vehicle is in the stationary state.

In operation S555, the MSCKF state is filtered. In this operation, the Kalman filtering method may be used to measure and update the state by using the lane line residual 534, the IMU covariance 535, the feature point re-projection residual 537, and the ZUPT and ZIHR residuals 538, so as to constantly estimate a state of the sliding window at the latest time instant.

In operation S556, the MSCKF state is marginalized. In this operation, a key frame may be selected as a frame in the sequence of timing sliding windows for marginalization, so as to maintain the size of sliding windows.

In operation S557, the feature point is re-tracked. In this operation, a more accurate pose may be obtained after the filter is updated. In the current frame, for a feature point that has not been successfully matched, the pose may be used to re-project the feature point back to an old key frame, and the feature point may be searched within a certain radius of a re-projection point on an image plane. When a distance of a nearest descriptor is less than a threshold, the feature point is determined to be successfully re-tracked.

According to embodiments of the present disclosure, after the filter completes the state update, the output module 540 may output an odometry pose 541 and a relative pose 542 according to an update result of the MSCKF filter module 530. The odometry pose may represent a pose of the movable object at the current time instant relative to that at a starting time instant, and the starting time instant may represent a time instant when the filter is turned on. The relative pose may represent an IMU coordinate system pose of a key frame corresponding to each sliding window in the sequence of timing sliding windows relative to an IMU coordinate system pose of a key frame corresponding to a starting sliding window in the sequence of timing sliding windows. The odometry pose and the relative pose may be used in a subsequent pose graph module, which is convenient for statistical analysis.

Through the above embodiments of the present disclosure, the visual inertial odometer based on the lane line and the feature point uses a tightly coupled method to fuse the IMU, the wheel speedometer, the vehicle speedometer, the non-lane line image feature point and the 3D lane line information, and uses the filter to estimate the state of the vehicle in real-time, which may output the smooth local positioning result with the high lateral accuracy. The filtering method may also achieve a higher computing efficiency.

Figure 6:
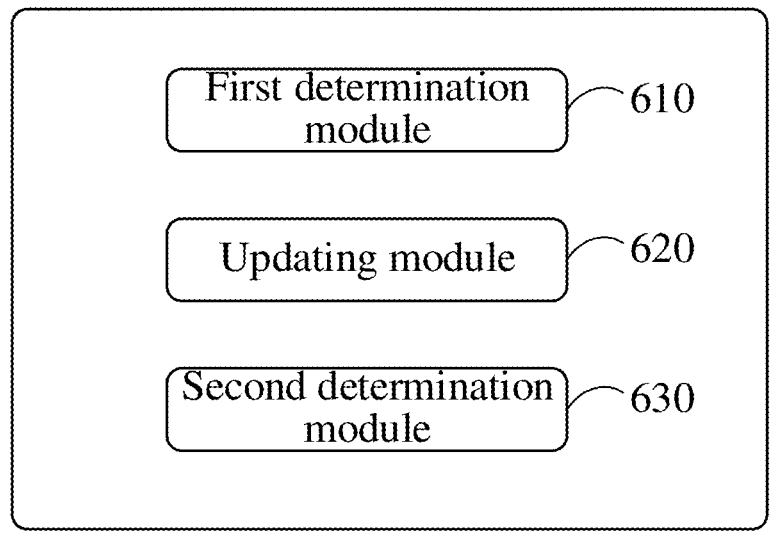
FIG. 6 schematically shows a block diagram of a positioning apparatus based on a lane line and a feature point according to embodiments of the present disclosure.

FIG. 6 schematically shows a block diagram of a positioning apparatus based on a lane line and a feature point according to embodiments of the present disclosure.

As shown in FIG. 6, a positioning apparatus 600 based on the lane line and the feature point may include a first determination module 610, an updating module 620, and a second determination module 630.

The first determination module 610 is used to determine a plurality of first real-time measurement residuals according to a plurality of first sensor information of a movable object detected, wherein the first sensor information includes a first IMU information, a first lane line feature information and a first non-lane line feature point information, and the first real-time measurement residual includes a first IMU measurement residual, a first lane line measurement residual and a first non-lane line measurement residual.

The updating module 620 is used to update a state vector of the movable object according to a kinematic model of an IMU and the plurality of first real-time measurement residuals.

The second determination module is used to determine a pose of the movable object at a time instant corresponding to the updated state vector according to a pose vector in the updated state vector.

According to embodiments of the present disclosure, the positioning apparatus based on the lane line and the feature point further includes a third determination module, a fourth determination module, a fifth determination module, a sixth determination module, and a seventh determination module.

The third determination module is used to determine a plurality of second real-time measurement residuals according to a plurality of second sensor information of the movable object detected, wherein the second sensor information includes a second IMU information, a second lane line feature information and a second non-lane line feature point information, and the second real-time measurement residual includes a second IMU measurement residual, a second lane line measurement residual and a second non-lane line measurement residual.

The fourth determination module is used to determine an initialization pose of the movable object according to the plurality of second real-time measurement residuals.

The fifth determination module is used to determine an initialization angular speedometer bias of the movable object according to the second lane line feature information and the second IMU information.

The sixth determination module is used to determine an initialization wheel speedometer scale and/or an initialization accelerometer bias according to the initialization angular speedometer bias, the second IMU information and the initialization pose.

The seventh determination module is used to determine an initialized state vector according to the initialization pose, the initialization angular speedometer bias, the initialization wheel speedometer scale, and the initialization accelerometer bias.

According to embodiments of the present disclosure, the first lane line measurement residual represents a distance residual formed by a line corresponding to a target first lane line feature point at a first sliding window and a feature point position corresponding to the target first lane line feature point at a second sliding window, and a time instant corresponding to the first sliding window is earlier than a time instant corresponding to the second sliding window. The first determination module includes a first determination unit, a second determination unit, and a third determination unit.

The first determination unit is used to determine a first pose corresponding to a first image frame and a second pose corresponding to a second image frame, wherein the first image frame corresponds to the first sliding window, and the second image frame corresponds to the second sliding window.

The second determination unit is used to determine a first position information of the target first lane line feature point in a normalization plane corresponding to the second image frame.

The third determination unit is used to determine the first lane line measurement residual according to the first pose, the second pose, the first position information, and a predefined linear model.

According to embodiments of the present disclosure, the first non-lane line measurement residual represents a reprojection residual of a target first non-lane line feature point in a third image frame corresponding to a third sliding window. The first determination module includes a fourth determination unit, a fifth determination unit, a sixth determination unit, and a seventh determination unit.

The fourth determination unit is used to determine a first measurement value of a second position information of the target first non-lane line feature point in a normalization plane corresponding to the third image frame according to a world coordinate information of the target first non-lane line feature point in a world coordinate system.

The fifth determination unit is used to determine a first rotation and a first translation between the world coordinate system and an IMU coordinate system.

The sixth determination unit is used to determine a first calculation value of the second position information of the target first non-lane line feature point in the normalization plane corresponding to the third image frame according to the world coordinate information, the first rotation, the first translation, an extrinsic parameter of a camera, and an extrinsic parameter of the IMU.

The seventh determination unit is used to determine the first non-lane line measurement residual according to the first measurement value and the first calculation value.

According to embodiments of the present disclosure, the first IMU measurement residual includes a pose measurement residual for the IMU of the movable object in a stationary state. The first determination module includes an eighth determination unit, a ninth determination unit, and a tenth determination unit.

The eighth determination unit is used to determine a first heading angle corresponding to a fourth image frame collected by the movable object in the stationary state and a second heading angle corresponding to a fifth image frame collected by the movable object in the stationary state, wherein the fourth image frame corresponds to a fourth sliding window, the fifth image frame corresponds to a fifth sliding window, and the fourth sliding window is adjacent to the fifth sliding window.

The ninth determination unit is used to determine, for the movable object in the stationary state, a second translation between an IMU coordinate system at a time instant when the fourth sliding window is positioned and a world coordinate system, and a third translation between an IMU coordinate system at a time instant when the fifth sliding window is positioned and the world coordinate system.

The tenth determination unit is used to determine the pose measurement residual according to the first heading angle, the second heading angle, the second translation, and the third translation.

According to embodiments of the present disclosure, the first IMU measurement residual includes a velocity measurement residual for the IMU of the movable object in a stationary state. The first determination module includes an eleventh determination unit and a twelfth determination unit.

The eleventh determination unit is used to determine an acceleration measurement value of the IMU of the movable object in the stationary state, an accelerometer bias of the IMU of the movable object in the stationary state, an angular velocity measurement value of the IMU of the movable object in the stationary state, and an angular speedometer bias of the IMU of the movable object in the stationary state.

The twelfth determination unit is used to determine the velocity measurement residual according to the acceleration measurement value, the accelerometer bias, the angular velocity measurement value, the angular speedometer bias, a second rotation between an IMU coordinate system and a world coordinate system, and a gravity vector of the movable object in the stationary state.

According to embodiments of the present disclosure, the first sensor information further includes a first wheel speedometer information. The first real-time measurement residual further includes a first wheel speedometer scale measurement residual. The first wheel speedometer scale measurement residual represents a scale measurement residual for each wheel of the movable object. The first determination module includes a thirteenth determination unit.

The thirteenth determination unit is used to determine, for each wheel of the movable object, the scale measurement residual for the wheel, according to a pose between a world coordinate system and an IMU coordinate system, a velocity of the IMU in the world coordinate system, a displacement between a coordinate system of the wheel and the IMU coordinate system, an angular velocity of the wheel detected by the IMU, a scale of the wheel, a radius of the wheel, and a velocity of the wheel.

According to embodiments of the present disclosure, the first sensor information further includes a first vehicle speedometer information. the first real-time measurement residual further includes a first vehicle velocity measurement residual. The first vehicle velocity measurement residual represents a measurement residual for a moving velocity of the movable object. The first determination module includes a fourteenth determination unit.

The fourteenth determination unit is used to determine the first vehicle velocity measurement residual according to an average velocity of the movable object within adjacent time instants and a velocity of the IMU in a world coordinate system.

According to embodiments of the present disclosure, the kinematic model includes a rotation state model, a translation state model, a velocity state model, an accelerometer bias state model and an angular speedometer bias state model. The updating module includes a fifteenth determination unit and a sixteenth determination unit.

The fifteenth determination unit is used to determine a covariance model of the IMU at a current time instant determined under a condition of a previous time instant, according to the rotation state model, the translation state model, the velocity state model, the accelerometer bias state model, and the angular speedometer bias state model detected at the previous time instant.

The sixteenth determination unit is used to determine a state vector at the current time instant according to a state vector at the current time instant determined under the condition of the previous time instant, the plurality of first real-time measurement residuals, a covariance of the IMU, and a measurement covariance determined at the current time instant, wherein the measurement covariance includes covariances related to all physical quantities detected by the movable object.

According to embodiments of the present disclosure, the second lane line measurement residual represents a distance residual formed by a line corresponding to a target second lane line feature point at a sixth sliding window and a feature point position corresponding to the target second lane line feature point at a seventh sliding window, and a time instant corresponding to the sixth sliding window is earlier than a time instant corresponding to the seventh sliding window. The third determination module includes a seventeenth determination unit, an eighteenth determination unit, a nineteenth determination unit, a twentieth determination unit, and a twenty-first determination unit.

The seventeenth determination unit is used to determine a fourth translation and a third rotation between an IMU coordinate system corresponding to the sixth sliding window and a world coordinate system, and a fifth translation and a fourth rotation between an IMU coordinate system corresponding to the seventh sliding window and the world coordinate system.

The eighteenth determination unit is used to determine a third position information of the target second lane line feature point in a normalization plane corresponding to a sixth image frame, wherein the sixth image frame corresponds to the sixth sliding window.

The nineteenth determination unit is used to determine a fourth position information of the target second lane line feature point in a normalization plane corresponding to a seventh image frame, wherein the seventh image frame corresponds to the seventh sliding window.

The twentieth determination unit is used to determine a direction vector of a line corresponding to the target second lane line feature point, wherein the line is in the sixth image frame.

The twenty-first determination unit is used to determine the second lane line measurement residual according to the third position information, the fourth translation, the third rotation, the fifth translation, the fourth rotation, the fourth position information, the direction vector, an extrinsic parameter of a camera, and an extrinsic parameter of the IMU.

According to embodiments of the present disclosure, the second non-lane line measurement residual represents a re-projection residual of a target second non-lane line feature point in an eighth image frame corresponding to an eighth sliding window. The third determination module includes a twenty-second determination unit, a twenty-third determination unit, a twenty-fourth determination unit, and a twenty-fifth determination unit.

The twenty-second determination unit is used to determine a second measurement value of a fifth position information of the target second non-lane line feature point in a camera coordinate system corresponding to the eighth sliding window, according to a first pixel abscissa and a first pixel column coordinate of the target second non-lane line feature point in the camera coordinate system corresponding to the eighth sliding window.

The twenty-third determination unit is used to determine a fifth rotation and a sixth translation between a world coordinate system and an IMU coordinate system corresponding to the eighth sliding window, and a sixth rotation and a seventh translation between the world coordinate system and an IMU coordinate system corresponding to a ninth sliding window, wherein a time instant corresponding to the ninth sliding window is earlier than a time instant corresponding to the eighth sliding window.

The twenty-fourth determination unit is used to determine a second calculation value of the fifth position information of the target second non-lane line feature point in the camera coordinate system corresponding to the eighth sliding window, according to a second pixel abscissa and a second pixel column coordinate of the target second non-lane line feature point in a camera coordinate system corresponding to the ninth sliding window, the fifth rotation, the sixth translation, the sixth rotation, the seventh translation, an extrinsic parameter of a camera, and an extrinsic parameter of the IMU.

The twenty-fifth determination unit is used to determine the second non-lane line measurement residual according to the second measurement value and the second calculation value.

According to embodiments of the present disclosure, the second sensor information further includes a second wheel speedometer information. The second real-time measurement residual further includes a second wheel speedometer scale measurement residual. The second wheel speedometer scale measurement residual represents a wheel speedometer integral residual between two time instants when sliding windows of two adjacent frames are positioned The third determination module includes a twenty-sixth determination unit and a twenty-seventh determination unit.

The twenty-sixth determination unit is used to determine, for each time instant of the two time instants, a seventh rotation and an eighth translation between an IMU coordinate system and a world coordinate system.

The twenty-seventh determination unit is used to determine the wheel speedometer integral residual according to a third measurement value of a first rotation offset formed by the IMU coordinate system at the two time instants, a fourth measurement value of a translation offset formed by a wheel speedometer integration at the two time instants, an angular speedometer bias of the IMU, the seventh rotation and the eighth translation corresponding to each of the two time instants.

According to embodiments of the present disclosure, the fifth determination module includes a twenty-eighth determination unit and a twenty-ninth determination unit.

The twenty-eighth determination unit is used to determine a third calculation value of a second rotation offset formed by an IMU coordinate system at two time instants when sliding windows of two adjacent frames are positioned according to a fifth measurement value of the second rotation offset formed by the IMU coordinate system at the two time instants when the sliding windows of two adjacent frames are positioned and an angular speedometer bias.

The twenty-ninth determination unit is used to determine the initialization angular speedometer bias according to the third calculation value and the fifth measurement value.

According to embodiments of the present disclosure, the sixth determination module includes a thirtieth determination unit, a thirty-first determination unit, and a thirty-second determination unit.

The thirtieth determination unit is used to in response to the pose vector and the angular speedometer bias being initialized, determine an IMU pre-integration model according to a first target velocity vector corresponding to a tenth sliding window, a second target velocity vector corresponding to an eleventh sliding window, a time difference formed by a time instant corresponding to the tenth sliding window and a time instant corresponding to the eleventh sliding window, a gravity vector, a wheel speedometer scale, a pose vector corresponding to the tenth sliding window, a pose vector corresponding to the eleventh sliding window, a rotation corresponding to the tenth sliding window, and a rotation corresponding to the eleventh sliding window.

The thirty-first determination unit is used to determine a least square optimization model corresponding to the IMU pre-integration model, wherein the least square optimization model includes at least one selected from: a velocity vector to be estimated, a gravity vector to be estimated, or a wheel speedometer scale to be estimated.

The thirty-second determination unit is used to determine the initialization wheel speedometer scale and/or the initialization accelerometer bias according to a gravity vector of a preset length, the IMU pre-integration model, and the least square optimization model.

According to embodiments of the present disclosure, a sliding window used to real-time detect the plurality of first sensor information is stored in a sequence of sequential sliding windows used to store sliding windows of a preset number of frames. The positioning apparatus based on the lane line and the feature point further includes an eighth determination module, a ninth determination module, a first processing module, and a second processing module.

The eighth determination module is used to for a sliding window of each frame stored in the sequence of sequential sliding windows, determine a sliding window meeting a preset condition as a key frame.

The ninth determination module is used to in response to a twelfth sliding window containing the updated state vector being received, determine, from the sequence of sequential sliding windows, a thirteenth sliding window closest to a time instant corresponding to the twelfth sliding window and a fourteenth sliding window farthest from the time instant corresponding to the twelfth sliding window, wherein the time instant corresponding to the twelfth sliding window is a current time instant.

The first processing module is used to in a case that the thirteenth sliding window belongs to the key frame, delete the fourteenth sliding window from the sequence of sequential sliding windows, and store the twelfth sliding window in the sequence of sequential sliding windows.

The second processing module is used to in a case that the thirteenth sliding window does not belong to the key frame, delete the thirteenth sliding window from the sequence of sequential sliding windows, and store the twelfth sliding window in the sequence of sequential sliding windows.

According to embodiments of the present disclosure, the eighth determination module includes a thirty-third determination unit and a thirty-fourth determination unit.

The thirty-third determination unit is used to determine a pose offset between a pose vector corresponding to the twelfth sliding window and a pose vector corresponding to the thirteenth sliding window.

The thirty-fourth determination unit is used to, in response to the pose offset being greater than a preset threshold, determine the twelfth sliding window as the key frame.

According to embodiments of the present disclosure, the present disclosure further provides an electronic device, a readable storage medium, a computer program product, and an autonomous vehicle.

According to embodiments of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the positioning method based on the lane line and the feature point mentioned in the present disclosure.

According to embodiments of the present disclosure, a non-transitory computer-readable storage medium having computer instructions stored thereon is provided, wherein the computer instructions are used to cause a computer to implement the positioning method based on the lane line and the feature point mentioned in the present disclosure.

According to embodiments of the present disclosure, a computer program product containing a computer program is provided, wherein the computer program, when executed by a processor, causes the processor to implement the positioning method based on the lane line and the feature point mentioned in the present disclosure.

Figure 7:
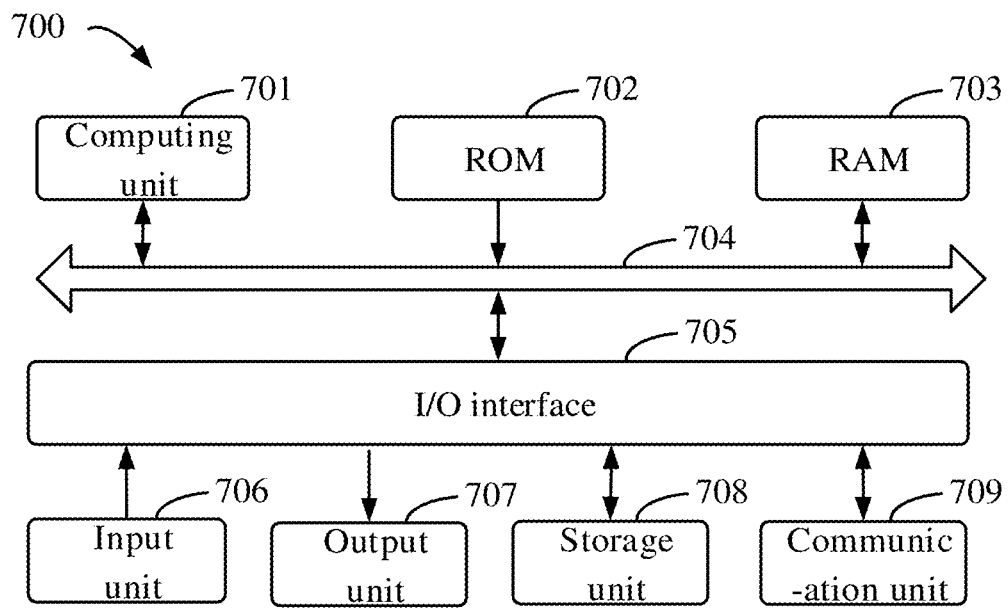
FIG. 7 shows a schematic block diagram of an example electronic device for implementing embodiments of the present disclosure.

FIG. 7 shows a block diagram of an exemplary electronic device 700 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the device 700 may include a computing unit 701, which may perform various appropriate actions and processing based on a computer program stored in a read-only memory (ROM) 702 or a computer program loaded from a storage unit 708 into a random access memory (RAM) 703. Various programs and data required for the operation of the device 700 may be stored in the RAM 703. The computing unit 701, the ROM 702 and the RAM 703 are connected to each other through a bus 704. An input/output (I/O) interface 705 is further connected to the bus 704.

Various components in the device 700, including an input unit 706 such as a keyboard, a mouse, etc., an output unit 707 such as various types of displays, speakers, etc., a storage unit 708 such as a magnetic disk, an optical disk, etc., and a communication unit 709 such as a network card, a modem, a wireless communication transceiver, etc., are connected to the I/O interface 705. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 701 may perform the various methods and processes described above, such as the positioning method based on the lane line and the feature point. For example, in some embodiments, the positioning method based on the lane line and the feature point may be implemented as a computer software program that is tangibly contained on a machine-readable medium, such as a storage unit 708. In some embodiments, part or all of a computer program may be loaded and/or installed on the device 700 via the ROM 702 and/or the communication unit 709. When the computer program is loaded into the RAM 703 and executed by the computing unit 701, one or more steps of the positioning method based on the lane line and the feature point described above may be performed. Alternatively, in other embodiments, the computing unit 701 may be configured to perform the positioning method based on the lane line and the feature point in any other appropriate way (for example, by means of firmware).

Based on the aforementioned electronic device, the electronic device may analyze the plurality of first sensor information and achieve determining the pose of the movable object.

Based on the aforementioned electronic device, the present disclosure further provides an autonomous vehicle, which may include the electronic device, a communication component, a display screen for achieving a human-computer interface, an information collection device for collecting a surrounding environment information, etc. Communication connection is available between the communication component, the display screen, the information collection device, and the electronic device.

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A positioning method based on a lane line and a feature point, the method comprising:
    determining a plurality of first real-time measurement residuals according to a plurality of first sensor information of a movable object detected, wherein the first sensor information comprises a first inertial measurement unit information, a first lane line feature information and a first non-lane line feature point information, and the first real-time measurement residual comprises a first inertial measurement unit measurement residual, a first lane line measurement residual and a first non-lane line measurement residual;
    updating a state vector of the movable object according to a kinematic model of an inertial measurement unit and the plurality of first real-time measurement residuals;
    determining a pose of the movable object at a time instant corresponding to the updated state vector according to a pose vector in the updated state vector; and
    controlling or positioning the movable object based on the determined pose of the movable object,
    wherein the method further comprises:
    determining a plurality of second real-time measurement residuals according to a plurality of second sensor information of the movable object detected, wherein the second sensor information comprises a second inertial measurement unit information, a second lane line feature information and a second non-lane line feature point information, and the second real-time measurement residual comprises a second inertial measurement unit measurement residual, a second lane line measurement residual and a second non-lane line measurement residual;
    determining an initialization pose of the movable object according to the plurality of second real-time measurement residuals;
    determining an initialization angular speedometer bias of the movable object according to the second lane line feature information and the second inertial measurement unit information;
    determining an initialization wheel speedometer scale and/or an initialization accelerometer bias according to the initialization angular speedometer bias, the second inertial measurement unit information and the initialization pose; and
    determining an initialized state vector according to the initialization pose, the initialization angular speedometer bias, the initialization wheel speedometer scale, and the initialization accelerometer bias.

2. The method according to claim 1, wherein the determining an initialization wheel speedometer scale and/or an initialization accelerometer bias according to the initialization angular speedometer bias, the second inertial measurement unit information and the initialization pose comprises:
    in response to the pose vector and the angular speedometer bias being initialized, determining an inertial measurement unit pre-integration model according to a first target velocity vector corresponding to a tenth sliding window, a second target velocity vector corresponding to an eleventh sliding window, a time difference formed by a time instant corresponding to the tenth sliding window and a time instant corresponding to the eleventh sliding window, a gravity vector, a wheel speedometer scale, a pose vector corresponding to the tenth sliding window, a pose vector corresponding to the eleventh sliding window, a rotation corresponding to the tenth sliding window, and a rotation corresponding to the eleventh sliding window, determining a least square optimization model corresponding to the inertial measurement unit pre-integration model, wherein the least square optimization model comprises at least one selected from: a velocity vector to be estimated, a gravity vector to be estimated, or a wheel speedometer scale to be estimated, and determining the initialization wheel speedometer scale and/or the initialization accelerometer bias according to a gravity vector of a preset length, the inertial measurement unit pre-integration model, and the least square optimization model.

3. The method according to claim 1, wherein the first lane line measurement residual represents a distance residual formed by a line corresponding to a target first lane line feature point at a first sliding window and a feature point position corresponding to the target first lane line feature point at a second sliding window, and a time instant corresponding to the first sliding window is earlier than a time instant corresponding to the second sliding window; and wherein the determining a plurality of first real-time measurement residuals according to a plurality of first sensor information of a movable object detected comprises:

determining a first pose corresponding to a first image frame and a second pose corresponding to a second image frame, wherein the first image frame corresponds to the first sliding window, and the second image frame corresponds to the second sliding window, determining a first position information of the target first lane line feature point in a normalization plane corresponding to the second image frame, and determining the first lane line measurement residual according to the first pose, the second pose, the first position information, and a predefined linear model.

4. The method according to claim 1, wherein the first non-lane line measurement residual represents a re-projection residual of a target first non-lane line feature point in a third image frame corresponding to a third sliding window; and wherein the determining a plurality of first real-time measurement residuals according to a plurality of first sensor information of a movable object detected comprises:

determining a first measurement value of a second position information of the target first non-lane line feature point in a normalization plane corresponding to the third image frame according to a world coordinate information of the target first non-lane line feature point in a world coordinate system, determining a first rotation and a first translation between the world coordinate system and an inertial measurement unit coordinate system, determining a first calculation value of the second position information of the target first non-lane line feature point in the normalization plane corresponding to the third image frame according to the world coordinate information, the first rotation, the first translation, an extrinsic parameter of a camera, and an extrinsic parameter of the inertial measurement unit, and determining the first non-lane line measurement residual according to the first measurement value and the first calculation value.

5. The method according to claim 1, wherein the first inertial measurement unit measurement residual comprises a pose measurement residual for the inertial measurement unit of the movable object in a stationary state; and wherein the determining a plurality of first real-time measurement residuals according to a plurality of first sensor information of a movable object detected comprises:

determining a first heading angle corresponding to a fourth image frame collected by the movable object in the stationary state and a second heading angle corresponding to a fifth image frame collected by the movable object in the stationary state, wherein the fourth image frame corresponds to a fourth sliding window, the fifth image frame corresponds to a fifth sliding window, and the fourth sliding window is adjacent to the fifth sliding window, determining, for the movable object in the stationary state, a second translation between an inertial measurement unit coordinate system at a time instant when the fourth sliding window is positioned and a world coordinate system, and a third translation between an inertial measurement unit coordinate system at a time instant when the fifth sliding window is positioned and the world coordinate system, and determining the pose measurement residual according to the first heading angle, the second heading angle, the second translation, and the third translation.

6. The method according to claim 1, wherein the first inertial measurement unit measurement residual comprises a velocity measurement residual for the inertial measurement unit of the movable object in a stationary state; and wherein the determining a plurality of first real-time measurement residuals according to a plurality of first sensor information of a movable object detected comprises:

determining an acceleration measurement value of the inertial measurement unit of the movable object in the stationary state, an accelerometer bias of the inertial measurement unit of the movable object in the stationary state, an angular velocity measurement value of the inertial measurement unit of the movable object in the stationary state, and an angular speedometer bias of the inertial measurement unit of the movable object in the stationary state; and determining the velocity measurement residual according to the acceleration measurement value, the accelerometer bias, the angular velocity measurement value, the angular speedometer bias, a second rotation between an inertial measurement unit coordinate system and a world coordinate system, and a gravity vector of the movable object in the stationary state.

7. The method according to claim 1, wherein the first sensor information further comprises a first wheel speedometer information; and wherein the first real-time measurement residual further comprises a first wheel speedometer scale measurement residual, and the first wheel speedometer scale measurement residual represents a scale measurement residual for each wheel of the movable object; and wherein the determining a plurality of first real-time measurement residuals according to a plurality of first sensor information of a movable object detected comprises determining, for each wheel of the movable object, the scale measurement residual for the wheel, according to a pose between a world coordinate system and an inertial measurement unit coordinate system, a velocity of the inertial measurement unit in the world coordinate system, a displacement between a coordinate system of the wheel and the inertial measurement unit coordinate system, an angular velocity of the wheel detected by the inertial measurement unit, a scale of the wheel, a radius of the wheel, and a velocity of the wheel.

8. The method according to claim 1, wherein the first sensor information further comprises a first vehicle speedometer information; and wherein the first real-time measurement residual further comprises a first vehicle velocity measurement residual, and the first vehicle velocity measurement residual represents a measurement residual for a moving velocity of the movable object; and wherein the determining a plurality of first real-time measurement residuals according to a plurality of first sensor information of a movable object detected comprises determining the first vehicle velocity measurement residual according to an average velocity of the movable object within adjacent time instants and a velocity of the inertial measurement unit in a world coordinate system.

9. The method according to claim 1, wherein the kinematic model comprises a rotation state model, a translation state model, a velocity state model, an accelerometer bias state model and an angular speedometer bias state model; and wherein the updating a state vector of the movable object according to a kinematic model of an inertial measurement unit and the plurality of first real-time measurement residuals comprises:

determining a covariance model of the inertial measurement unit at a current time instant determined under a condition of a previous time instant, according to the rotation state model, the translation state model, the velocity state model, the accelerometer bias state model, and the angular speedometer bias state model detected at the previous time instant, and determining a state vector at the current time instant according to a state vector at the current time instant determined under the condition of the previous time instant, the plurality of first real-time measurement residuals, a covariance of the inertial measurement unit, and a measurement covariance determined at the current time instant, wherein the measurement covariance comprises covariances related to all physical quantities detected by the movable object.

10. The method according to claim 1, wherein the second lane line measurement residual represents a distance residual formed by a line corresponding to a target second lane line feature point at a sixth sliding window and a feature point position corresponding to the target second lane line feature point at a seventh sliding window, and a time instant corresponding to the sixth sliding window is earlier than a time instant corresponding to the seventh sliding window; and wherein the determining a plurality of second real-time measurement residuals according to a plurality of second sensor information of a movable object detected comprises:

determining a fourth translation and a third rotation between an inertial measurement unit coordinate system corresponding to the sixth sliding window and a world coordinate system, and a fifth translation and a fourth rotation between an inertial measurement unit coordinate system corresponding to the seventh sliding window and the world coordinate system, determining a third position information of the target second lane line feature point in a normalization plane corresponding to a sixth image frame, wherein the sixth image frame corresponds to the sixth sliding window, determining a fourth position information of the target second lane line feature point in a normalization plane corresponding to a seventh image frame, wherein the seventh image frame corresponds to the seventh sliding window, determining a direction vector of a line corresponding to the target second lane line feature point, wherein the line is in the sixth image frame, and determining the second lane line measurement residual according to the third position information, the fourth translation, the third rotation, the fifth translation, the fourth rotation, the fourth position information, the direction vector, an extrinsic parameter of a camera, and an extrinsic parameter of the inertial measurement unit.

11. The method according to claim 1, wherein the second non-lane line measurement residual represents a re-projection residual of a target second non-lane line feature point in an eighth image frame corresponding to an eighth sliding window; and wherein the determining a plurality of second real-time measurement residuals according to a plurality of second sensor information of a movable object detected comprises:

determining a second measurement value of a fifth position information of the target second non-lane line feature point in a camera coordinate system corresponding to the eighth sliding window, according to a first pixel abscissa and a first pixel column coordinate of the target second non-lane line feature point in the camera coordinate system corresponding to the eighth sliding window, determining a fifth rotation and a sixth translation between a world coordinate system and an inertial measurement unit coordinate system corresponding to the eighth sliding window, and a sixth rotation and a seventh translation between the world coordinate system and an inertial measurement unit coordinate system corresponding to a ninth sliding window, wherein a time instant corresponding to the ninth sliding window is earlier than a time instant corresponding to the eighth sliding window, determining a second calculation value of the fifth position information of the target second non-lane line feature point in the camera coordinate system corresponding to the eighth sliding window, according to a second pixel abscissa and a second pixel column coordinate of the target second non-lane line feature point in a camera coordinate system corresponding to the ninth sliding window, the fifth rotation, the sixth translation, the sixth rotation, the seventh translation, an extrinsic parameter of a camera, and an extrinsic parameter of the inertial measurement unit, and determining the second non-lane line measurement residual according to the second measurement value and the second calculation value.

12. The method according to claim 1, wherein the second sensor information further comprises a second wheel speedometer information; and
wherein the second real-time measurement residual further comprises a second wheel speedometer scale measurement residual, and the second wheel speedometer scale measurement residual represents a wheel speedometer integral residual between two time instants when sliding windows of two adjacent frames are positioned; and
wherein the determining a plurality of second real-time measurement residuals according to a plurality of second sensor information of a movable object detected comprises:
determining, for each time instant of the two time instants, a seventh rotation and an eighth translation between an inertial measurement unit coordinate system and a world coordinate system, and
determining the wheel speedometer integral residual according to a third measurement value of a first rotation offset formed by the inertial measurement unit coordinate system at the two time instants, a fourth measurement value of a translation offset formed by a wheel speedometer integration at the two time instants, an angular speedometer bias of the inertial measurement unit, the seventh rotation and the eighth translation corresponding to each of the two time instants.

13. The method according to claim 1, wherein the determining an initialization angular speedometer bias of the movable object according to the second lane line feature information and the second inertial measurement unit information comprises:
determining a third calculation value of a second rotation offset formed by an inertial measurement unit coordinate system at two time instants when sliding windows of two adjacent frames are positioned according to a fifth measurement value of the second rotation offset formed by the inertial measurement unit coordinate system at the two time instants when the sliding windows of two adjacent frames are positioned and an angular speedometer bias, and
determining the initialization angular speedometer bias according to the third calculation value and the fifth measurement value.

14. The method according to claim 1, wherein a sliding window configured to real-time detect the plurality of first sensor information is stored in a sequence of sequential sliding windows configured to store sliding windows of a preset number of frames; and
further comprising:
for a sliding window of each frame stored in the sequence of sequential sliding windows, determining a sliding window meeting a preset condition as a key frame,
in response to a twelfth sliding window containing the updated state vector being received, determining, from the sequence of sequential sliding windows, a thirteenth sliding window closest to a time instant corresponding to the twelfth sliding window and a fourteenth sliding window farthest from the time instant corresponding to the twelfth sliding window, wherein the time instant corresponding to the twelfth sliding window is a current time instant,
in a case that the thirteenth sliding window belongs to the key frame, deleting the fourteenth sliding window from the sequence of sequential sliding windows, and storing the twelfth sliding window in the sequence of sequential sliding windows, and
in a case that the thirteenth sliding window does not belong to the key frame, deleting the thirteenth sliding window from the sequence of sequential sliding windows, and storing the twelfth sliding window in the sequence of sequential sliding windows.

15. The method according to claim 14, wherein the determining a sliding window meeting a preset condition as a key frame comprises:
determining a pose offset between a pose vector corresponding to the twelfth sliding window and a pose vector corresponding to the thirteenth sliding window; and
in response to the pose offset being greater than a preset threshold, determining the twelfth sliding window as the key frame.

16. An electronic device, comprising:
at least one processor; and
a memory communicatively connected to the at least one processor, wherein the memory stores instructions executable by the at least one processor, the instructions, when executed by the at least one processor, configured to cause the at least one processor to at least:
determine a plurality of first real-time measurement residuals according to a plurality of first sensor information of a movable object detected, wherein the first sensor information comprises a first inertial measurement unit information, a first lane line feature information and a first non-lane line feature point information, and the first real-time measurement residual comprises a first inertial measurement unit measurement residual, a first lane line measurement residual and a first non-lane line measurement residual;
update a state vector of the movable object according to a kinematic model of an inertial measurement unit and the plurality of first real-time measurement residuals; and
determine a pose of the movable object at a time instant corresponding to the updated state vector according to a pose vector in the updated state vector; and
control or cause positioning of the movable object based on the determined pose of the movable object,
wherein the instructions, when executed by the at least one processor, are further configured to cause the at least one processor to:
determine a plurality of second real-time measurement residuals according to a plurality of second sensor information of the movable object detected, wherein the second sensor information comprises a second inertial measurement unit information, a second lane line feature information and a second non-lane line feature point information, and the second real-time measurement residual comprises a second inertial measurement unit measurement residual, a second lane line measurement residual and a second non-lane line measurement residual;
determine an initialization pose of the movable object according to the plurality of second real-time measurement residuals;
determine an initialization angular speedometer bias of the movable object according to the second lane line feature information and the second inertial measurement unit information;
determine an initialization wheel speedometer scale and/or an initialization accelerometer bias according to the initialization angular speedometer bias, the second inertial measurement unit information and the initialization pose; and determine an initialized state vector according to the initialization pose, the initialization angular speedometer bias, the initialization wheel speedometer scale, and the initialization accelerometer bias.

17. The electronic device according to claim 16, wherein the first lane line measurement residual represents a distance residual formed by a line corresponding to a target first lane line feature point at a first sliding window and a feature point position corresponding to the target first lane line feature point at a second sliding window, and a time instant corresponding to the first sliding window is earlier than a time instant corresponding to the second sliding window, and wherein the instructions are further configured to cause the at least one processor to at least:

determine a first pose corresponding to a first image frame and a second pose corresponding to a second image frame, wherein the first image frame corresponds to the first sliding window, and the second image frame corresponds to the second sliding window, determine a first position information of the target first lane line feature point in a normalization plane corresponding to the second image frame, and determine the first lane line measurement residual according to the first pose, the second pose, the first position information, and a predefined linear model.

18. A non-transitory computer-readable storage medium having computer instructions stored thereon or therein, the computer instructions configured to cause a computer system to at least:

determine a plurality of first real-time measurement residuals according to a plurality of first sensor information of a movable object detected, wherein the first sensor information comprises a first inertial measurement unit information, a first lane line feature information and a first non-lane line feature point information, and the first real-time measurement residual comprises a first inertial measurement unit measurement residual, a first lane line measurement residual and a first non-lane line measurement residual;

update a state vector of the movable object according to a kinematic model of an inertial measurement unit and the plurality of first real-time measurement residuals; and determine a pose of the movable object at a time instant corresponding to the updated state vector according to a pose vector in the updated state vector; and control or cause positioning of the movable object based on the determined pose of the movable object, wherein the instructions are further configured to cause the computer system to:

determine a plurality of second real-time measurement residuals according to a plurality of second sensor information of the movable object detected, wherein the second sensor information comprises a second inertial measurement unit information, a second lane line feature information and a second non-lane line feature point information, and the second real-time measurement residual comprises a second inertial measurement unit measurement residual, a second lane line measurement residual and a second non-lane line measurement residual;

determine an initialization pose of the movable object according to the plurality of second real-time measurement residuals;

determine an initialization angular speedometer bias of the movable object according to the second lane line feature information and the second inertial measurement unit information;

determine an initialization wheel speedometer scale and/or an initialization accelerometer bias according to the initialization angular speedometer bias, the second inertial measurement unit information and the initialization pose; and determine an initialized state vector according to the initialization pose, the initialization angular speedometer bias, the initialization wheel speedometer scale, and the initialization accelerometer bias.

19. The non-transitory computer-readable storage medium according to claim 18, wherein the first lane line measurement residual represents a distance residual formed by a line corresponding to a target first lane line feature point at a first sliding window and a feature point position corresponding to the target first lane line feature point at a second sliding window, and a time instant corresponding to the first sliding window is earlier than a time instant corresponding to the second sliding window; and wherein the instructions configured to cause the computer system to determine a plurality of first real-time measurement residuals according to a plurality of first sensor information of a movable object detected are further configured to cause the computer system to:

determine a first pose corresponding to a first image frame and a second pose corresponding to a second image frame, wherein the first image frame corresponds to the first sliding window, and the second image frame corresponds to the second sliding window, determine a first position information of the target first lane line feature point in a normalization plane corresponding to the second image frame, and determine the first lane line measurement residual according to the first pose, the second pose, the first position information, and a predefined linear model.

20. The non-transitory computer-readable storage medium according to claim 18, wherein the first non-lane line measurement residual represents a re-projection residual of a target first non-lane line feature point in a third image frame corresponding to a third sliding window; and wherein the instructions configured to cause the computer system to determine a plurality of first real-time measurement residuals according to a plurality of first sensor information of a movable object detected are further configured to cause the computer system to:

determine a first measurement value of a second position information of the target first non-lane line feature point in a normalization plane corresponding to the third image frame according to a world coordinate information of the target first non-lane line feature point in a world coordinate system, determine a first rotation and a first translation between the world coordinate system and an inertial measurement unit coordinate system, determine a first calculation value of the second position information of the target first non-lane line feature point in the normalization plane corresponding to the third image frame according to the world coordinate information, the first rotation, the first translation, an extrinsic parameter of a camera, and an extrinsic parameter of the inertial measurement unit, and determine the first non-lane line measurement residual according to the first measurement value and the first calculation value.

* * * * *